US012764692B2

(12) United States Patent
Aghili et al.

(10) Patent No.: US 12,764,692 B2
(45) Date of Patent: Oct. 13, 2026

(54) METHODS, APPARATUS, AND SYSTEMS FOR MINIMIZATION OF SERVICE INTERRUPTIONS (MINT)

(71) Applicant: InterDigital Patent Holdings, Inc., Wilmington, DE (US)

(72) Inventors: Behrouz Aghili, Commack, NY (US); Samir Ferdi, Kirkland (CA); Alec Brusilovsky, Downingtown, PA (US); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 464 days.

(21) Appl. No.: 18/272,223

(22) PCT Filed: Jan. 12, 2022

(86) PCT No.: PCT/US2022/012073
§ 371 (c)(1),
(2) Date: Jul. 13, 2023

(87) PCT Pub. No.: WO2022/155168
PCT Pub. Date: Jul. 21, 2022

(65) Prior Publication Data

US 2024/0080791 A1 Mar. 7, 2024

Related U.S. Application Data

(60) Provisional application No. 63/185,474, filed on May 7, 2021, provisional application No. 63/172,936, filed
(Continued)

(51) Int. Cl.
*H04W 60/04* (2009.01)
*H04W 4/90* (2018.01)
*H04W 60/00* (2009.01)

(52) U.S. Cl.
CPC ............. *H04W 60/04* (2013.01); *H04W 4/90* (2018.02); *H04W 60/005* (2013.01)

(58) Field of Classification Search
CPC ....... H04W 4/90; H04W 60/04; H04W 48/18; H04W 48/16; H04W 60/00;
(Continued)

(56) References Cited

U.S. PATENT DOCUMENTS 10,499,357 B1 * 12/2019 Tiwari ................ H04W 60/001
11,044,786 B2 * 6/2021 Kuppelur ............ H04W 68/005
(Continued)

FOREIGN PATENT DOCUMENTS

JP H0319533 1/1991
JP 2023019533 A 2/2023
(Continued)

OTHER PUBLICATIONS

Qualcomm Incorporated: "Addition of Key Issue on prevention of signalling overload in PLMNs without Disaster Condition for Mint", 3GPP Draft; C1-207684, 3rd Generation Partnership Project (3GPP), Mobile Competence Centre; 650 Route DES Lucioles; F-06921 Sophia-Antipolis Cedex, France, vol. CT WG1, No. Electronic Meeting; Nov. 13, 2020-Nov. 20, 2020, Nov. 19, 2020, 3 pages.
(Continued)

*Primary Examiner* — Matthew C Sams
(74) *Attorney, Agent, or Firm* — Majid Albassam

(57) ABSTRACT

Methods, apparatus and systems are disclosed. In one embodiment, a method, implemented by a Wireless Transmit/Receive Unit (WTRU) registered to a first network, includes receiving, from the first network, information indicating a value to be used during a registration to a second network; and determining, based on at least the indicated value, at least a first start time and a second start time from
(Continued)

which to perform the registration to the second network. The method further includes initiating the registration to the second network after the first start time; and on condition that the registration is not completed within a defined period after the first start time: (1) halting the registration to the second network, and (2) initiating a second registration or re-registration of the WTRU to the second network after the second start time.

30 Claims, 14 Drawing Sheets

Related U.S. Application Data on Apr. 9, 2021, provisional application No. 63/150,283, filed on Feb. 17, 2021, provisional application No. 63/137,531, filed on Jan. 14, 2021.

(58) Field of Classification Search

CPC ..... H04W 84/042; H04W 8/02; H04W 24/04; H04W 48/06; H04W 60/06; H04W 8/06; H04W 8/12; H04W 36/00224; H04W 4/02; H04W 4/029; H04W 4/06; H04W 48/10; H04W 48/12; H04W 68/005; H04W 76/10; H04W 76/25; H04W 76/38; H04W 76/50; H04W 8/08; H04W 8/205; H04W 8/24; H04W 8/26; H04W 88/023; H04W 88/06; H04W 88/14; H04W 12/02; H04W 12/08; H04W 12/48; H04W 28/02; H04W 28/0226; H04W 28/0289; H04W 48/02; H04W 48/08; H04W 60/001; H04W 60/02; H04W 8/18; H04W 8/183; H04W 60/005; H04L 69/28; H04L 69/40

See application file for complete search history.

(56) References Cited

U.S. PATENT DOCUMENTS

| | | | | |
|---|---|---|---|---|
| 12,200,611 | B2 * | 1/2025 | Chaponniere | H04W 8/26 |
| 12,267,911 | B2 * | 4/2025 | Vamanan | H04W 60/04 |
| 2020/0008269 | A1 * | 1/2020 | Kuppelur | H04W 4/029 |
| 2022/0030657 | A1 * | 1/2022 | Yamine | H04W 48/12 |
| 2022/0141758 | A1 * | 5/2022 | Chaponniere | H04W 8/26<br>370/329 |
| 2023/0036756 | A1 | 2/2023 | Ogawa | |
| 2023/0043617 | A1 * | 2/2023 | Vamanan | H04W 8/12 |
| 2023/0254733 | A1 * | 8/2023 | Park | H04W 4/90<br>370/229 |
| 2023/0269689 | A1 * | 8/2023 | Park | H04W 4/90<br>455/432.1 |
| 2023/0370964 | A1 * | 11/2023 | Chaponniere | H04W 48/18 |
| 2023/0388957 | A1 * | 11/2023 | Chen | H04W 4/90 |
| 2024/0007878 | A1 * | 1/2024 | Starsinic | H04W 4/06 |
| 2024/0073785 | A1 * | 2/2024 | Bhowmik | H04W 8/06 |
| 2024/0314595 | A1 * | 9/2024 | Starsinic | H04W 24/04 |

FOREIGN PATENT DOCUMENTS

| | | | | |
|---|---|---|---|---|
| JP | 2024506092 A | | 2/2024 | |
| WO | WO 2004112314 A1 | | 12/2004 | |
| WO | WO-2015074245 A1 | * | 5/2015 | H04W 48/18 |
| WO | WO-2022014961 A1 | * | 1/2022 | H04W 48/06 |
| WO | WO-2025183446 A1 | * | 9/2025 | H04W 48/18 |

OTHER PUBLICATIONS

"3rd Generation Partnership Project; Technical Specification Group Cor Network and Terminals; Study on the support for minimization of service interruption; (Release 17)", 3GPP Standard; Technical Report; 3GPP TR 24.811, 3rd Generation Partnership Project (3GPP), Mobile Competence Centre; 650, Route Des Lucioles; F-06921 Sophia-Antipolis Cedex; France , No. V0.1.0 Dec. 14, 2020, 14 pages.

"3rd Generation Partnership Project; Technical Specification Group Services and System Aspects; System architecture for the 5G System (5GS); Stage 2 (Release 16)," 3GPP TS 23.501 V16.7.0 (Dec. 2020), 450 pages.

Qualcomm Inc., "Solution to MINT Key Issue #7 (Prevention of signalling overload in PLMNs without Disaster Condition)—Alternative 1: providing disaster roaming assistance information to distribute roamers, and congestion mitigation", 3GPP Tdoc C1-210116, 3GPP TSG-CT WG1 Meeting #127bis-e Electronic meeting; Jan. 25-29, 2021, 5 pages.

"Enabling the PLMN without Disaster Condition to efficiently prevent Disaster Inbound Roamers from attempting registration", 3GPP Tdoc C1-210129, 3GPP TSG-CT WG1 Meeting #127bis-e Electronic meeting; Jan. 25-29, 2021, 2 pages.

English Language Abstract, Japanese Publication No. JPH0319533 published Jan. 28, 1991, 1 page.

3rd Generation Partnership Project; Technical Specification Group Services and System Aspects; Service accessibility (Release 17); 3GPP TS 22.011 V17.3.0, Dec. 2020, 33 pages.

3rd Generation Partnership Project; Technical Specification Group Services and System Aspects; Service requirements for the 5G system; Stage 1 (Release 18); 3GPP TS 22.261 V18.1.0, Dec. 2020, 85 pages.

Interdigital, "Staggering the arrivals of UEs in the PLMN without Disaster Condition", 3GPP Tdoc C1-210127, 3GPP TSG-CT WG1 Meeting #127bis-e Electronic meeting; Jan. 25-29, 2021, 2 pages.

* cited by examiner

1600

METHODS, APPARATUS, AND SYSTEMS FOR MINIMIZATION OF SERVICE INTERRUPTIONS (MINT)

CROSS-REFERENCE TO RELATED APPLICATIONS

This application is a U.S. National Stage Application under 35 U.S.C. 371 of International Patent Application No. PCT/2022/012073, filed Jan. 12, 2022, which is incorporated herein by reference in its entirety. This application claims the benefit of U.S. Provisional Application No. 63/185,474, filed May 7, 2021, U.S. Provisional Application No. 63/172,936, filed Apr. 9, 2021, U.S. Provisional Application No. 63/150,283, filed Feb. 17, 2021, and U.S. Provisional Application No. 63/137,531, filed Jan. 14, 2021, the contents of each of which is incorporated herein by reference in their entirety.

FIELD

Embodiments disclosed herein generally relate to wireless communications and, for example to methods, apparatus and systems for minimization of service interruptions.

RELATED ART

Networks sometimes experience failures and/or disasters.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein.

DETAILED DESCRIPTION

Example Networks for Implementation of the Embodiments

Figure 1A:
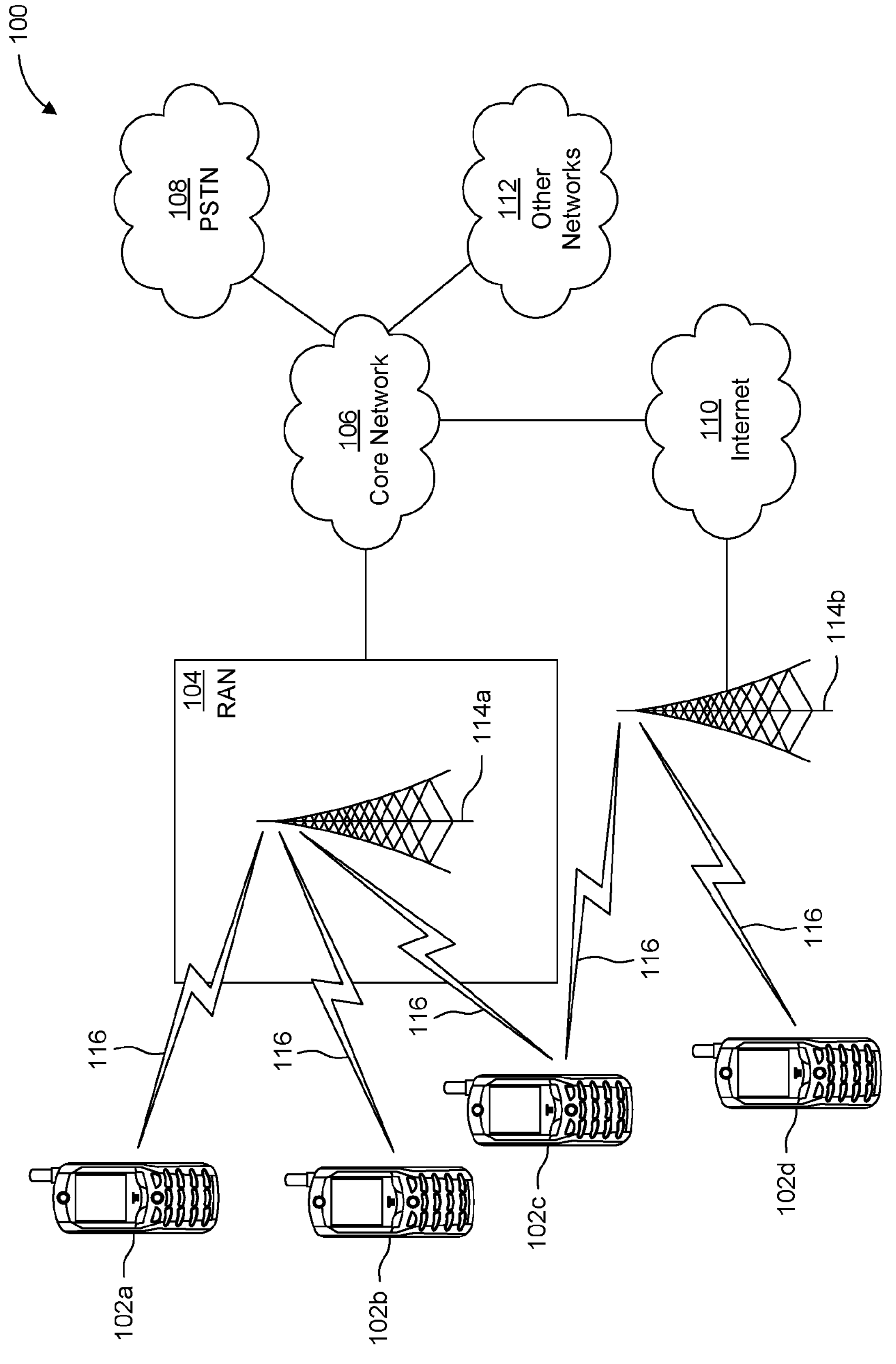
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B (end), a Home Node B (HNB), a Home eNode B (HeNB), a gNB, a NR Node B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
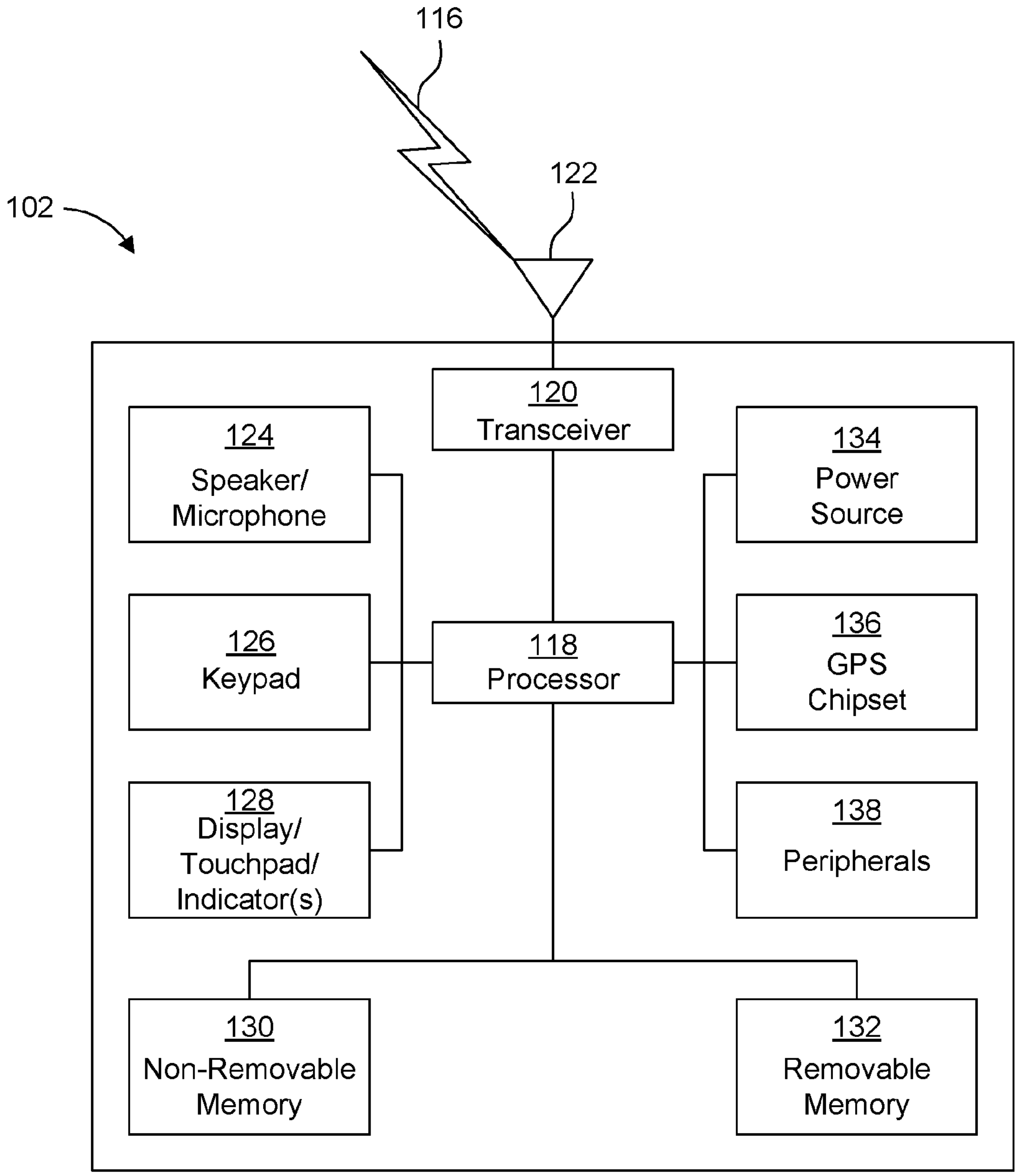
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
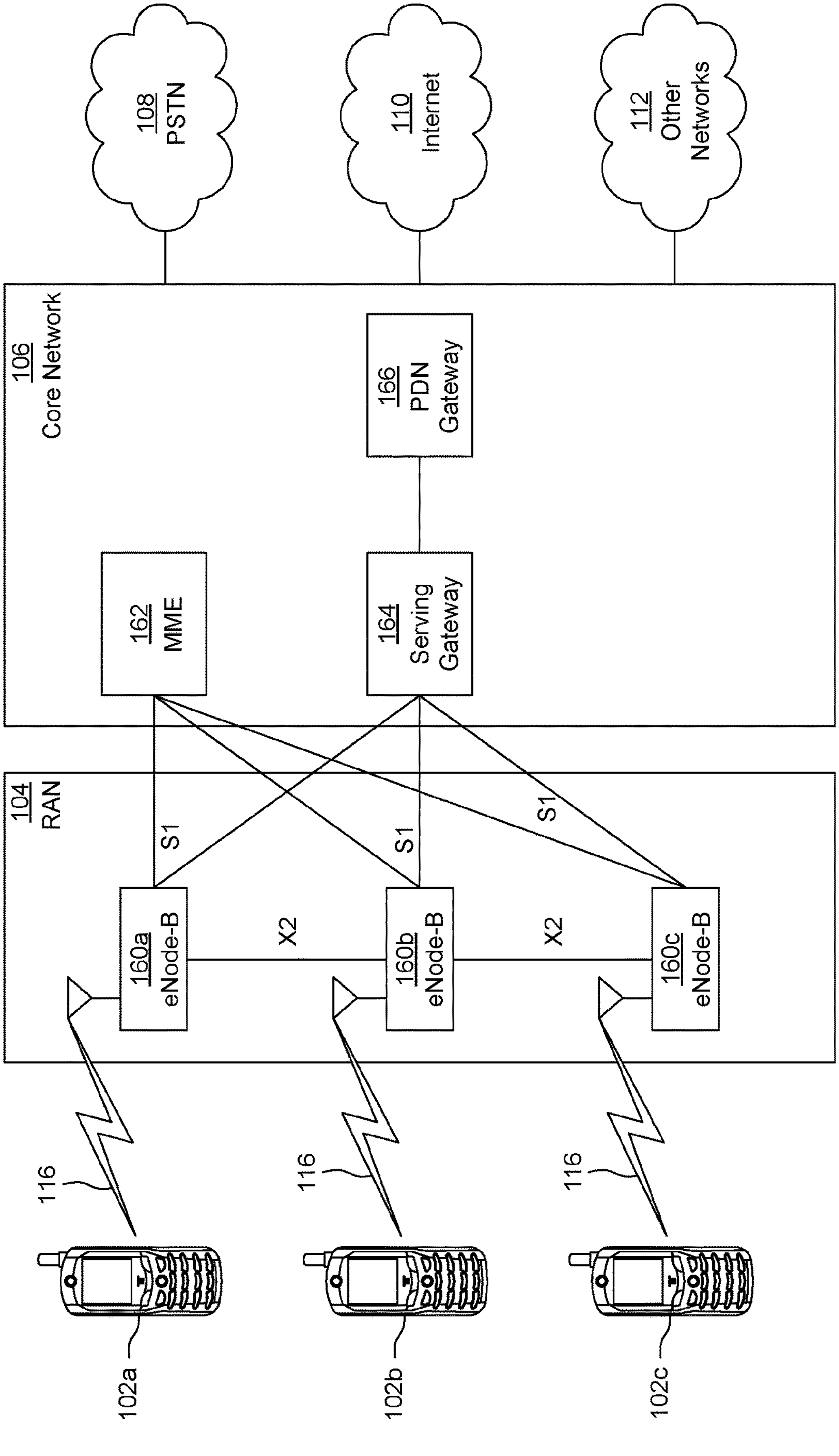
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode Bs 160*a*, 160*b*, 160*c*, though it will be appreciated that the RAN 104 may include any number of eNode Bs while remaining consistent with an embodiment. The eNode Bs 160*a*, 160*b*, 160*c* may each include one or more transceivers for communicating with the WTRUs 102*a*, 102*b*, 102*c* over the air interface 116. In one embodiment, the eNode Bs 160*a*, 160*b*, 160*c* may implement MIMO technology. Thus, the eNode B 160*a*, for example, may use multiple antennas to transmit wireless signals to, and/or receive wireless signals from, the WTRU 102*a*.

Each of the eNode Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped onto the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
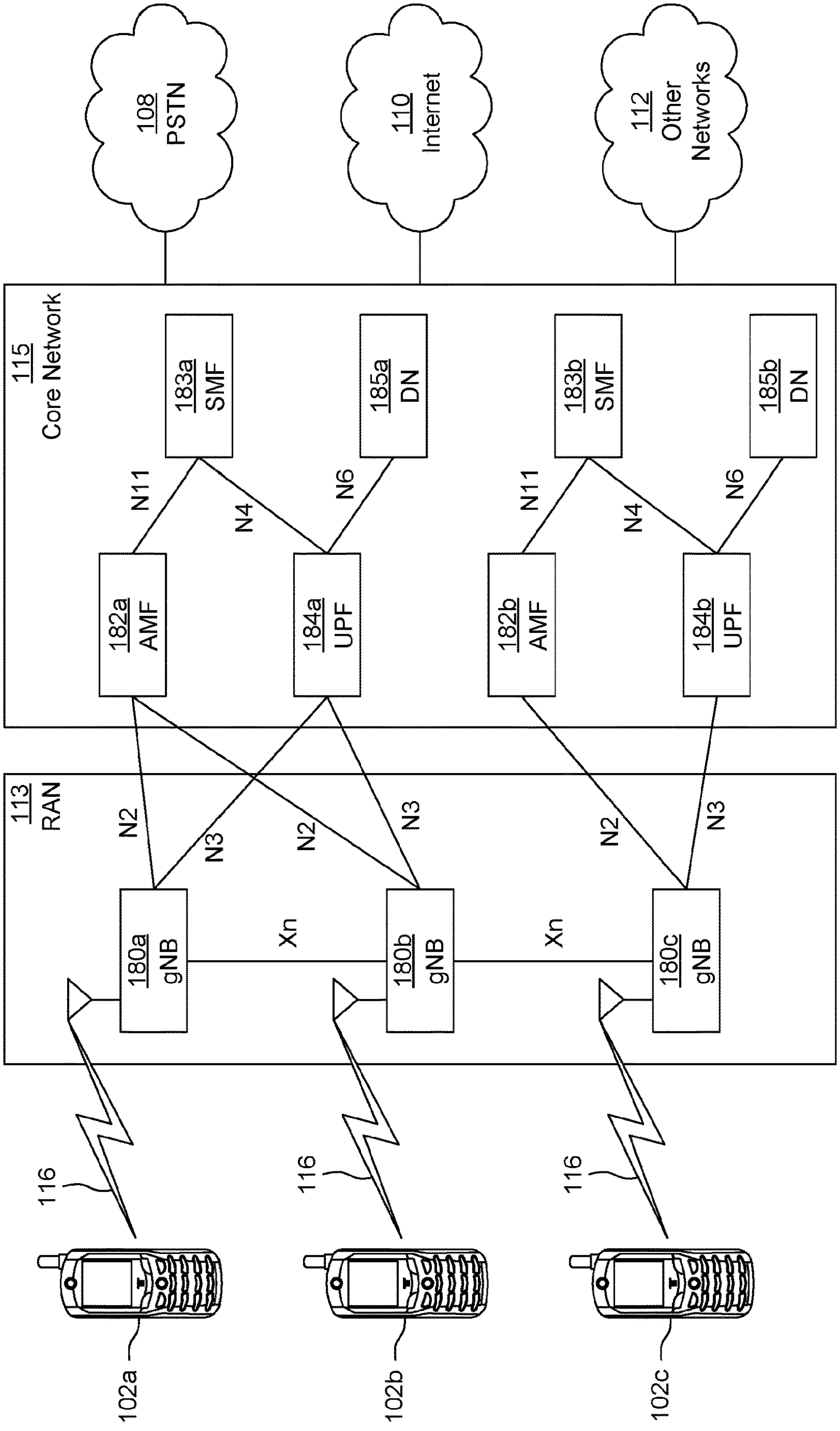
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 180*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode Bs 160*a*, 160*b*, 160*c*. For example, WTRUs 102*a*, 102*b*, 102*c* may implement DC principles to communicate with one or more gNBs 180*a*, 180*b*, 180*c* and one or more eNode Bs 160*a*, 160*b*, 160*c* substantially simultaneously. In the non-standalone configuration, eNode Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements is depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different Protocol Data Unit (PDU) sessions with different requirements), selecting a particular SMF 183*a*, 183*b*, management of the registration area, termination of Non-Access Stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency communication (URLLC) access, services relying on enhanced mobile (e.g., massive mobile) broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating a WTRU IP (e.g., UE IP) address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In certain representative embodiments, the WTRU may use a timer that the network (NW) (e.g., a network entity) provides in a Registration Accept, e.g., along with its own identity, to derive a window over which the WTRU may or is to perform registration to a new network (e.g., via a new network entity).

In certain representative embodiments, during the registration procedure, the NW may inform the WTRU of an identifier (e.g., a "Special ID") that the NW may or is to use when one or more disaster conditions apply. For example, as protection or for security, the NW may provide the WTRU with a string (e.g., a code) that may be used by the WTRU locally together with a broadcast ID and a known algorithm, which may then result in a Permanent IE (e.g., Subscription Permanent Identifier (SUPT)/International Mobile Equipment Identity (IMEI) of the WTRU.

In certain representative embodiments, the RAN may be provided with information by the CN to block/postpone RRC connections for inbound (e.g., disaster) WTRUs. These WTRUs may use a new establishment cause when sending an RRC Connection Request. The RAN may provide a timer in an RRC Connection Reject, which may for example delay/postpone a new connection of the WTRU to a later time slot. To further randomize the delay period for the connection retry, the WTRU may use a formula based on the value of the timer and its own ID.

In certain representative embodiments, the WTRU may receive a Disaster Response Incident ID (DRID) when registering with PLMN D (e.g., before a disaster condition). The WTRU may select a PLMN (e.g., PLMN A) based on a matching DRID broadcasted by the PLMN (e.g., PLMN A), when the disaster condition occurs. The WTRU may register for inbound roaming with the PLMN A and may provide the DRID to be authorized for inbound roaming by the HPLMN.

In certain representative embodiments, upon registration in the PLMN (e.g. PLMN D) (e.g., which may normally be the HPLMN), when the WTRU and the AMF exchange information that the WTRU and the AMF both support MINT, and the AMF provides a list of Tracking Areas (e.g., a TAI list), the WTRU may inform the AMF, when the WTRU enters a new TA (for example each or every time it enters a new Tracking Area (TA)), even though the new TA is or may be part of the TAI list. The WTRU does this operation, for example by: (1) modifying one or more existing NAS messages such as a Service Request, (2) sending a new NAS message, and/or (3) performing a mobility Registration Update, among others.

PLMN D herein may generally refer to a PLMN having/experiencing or going to have/experience an associated disaster condition that: (1) was previously notified and/or set; (2) is going to be notified/set; and/or (3) is currently notified/set. For example, PLMN D may have a power outage (e.g., causing a lack of operation of the network within a portion or all of the associated PLMN coverage area) or PLMN D may have some other disruption of the network in some or all of the associated PLMN coverage area. PLMN D may be the Home PLMN or a visiting PLMN. PLMN A herein may generally refer to another PLMN and may or may not be able to accept inbound roaming WTRUs registered to or trying to register to, for example the PLMN D having and/or experiencing a disaster condition.

Certain representative embodiments may apply to a disaster event somewhere in the network (for example, such as a fire event in the building where certain network nodes and components reside).

In certain representative embodiments, the WTRU may receive one or more allowed Area-level DRIDs when registering with a PLMN (e.g., PLMN D) (before a disaster condition). For example, the DRID may be composed of or may include a PLMN ID (MCC,MNC), an Area ID (AID) and/or a Disaster Recovery Code (DRC) (e.g., the DRID=PLMN ID+AID+DRC). The AID may identify a geographical area that maps a part of the PLMN's coverage area (e.g., the PLMN D's NG-RAN coverage area) (e.g., associated with or including one or more NG-RAN nodes and/or one or more Tracking Areas (TA), among others). The WTRU may select another PLMN (e.g., PLMN A) based on matching DRID or portion of the DRID (e.g. the DRC) broadcasted by the PLMN A with one or more allowed DRIDs indicated by PLMN D. The WTRU may register for inbound roaming with the other PLMN (e.g., PLMN A) and may provide a matching protected DRID to be authorized for inbound roaming by the HPLMN.

In certain representative embodiments, the WTRU may be configured (e.g., by the HPLMN) with one or more allowed Region-level DRID and/or an allowed PLMN-level DRID associated with a given PLMN (e.g. PLMN D as the WTRU's HPLMN). The PLMN-level DRID composition/components may be similar to an Area specific DRID except that the AID may identify a geographical area that maps the entire PLMN. The Region-level DRID composition/components may be similar to an Area-specific DRID except that the AID may identify a geographical area that maps a portion (e.g., a wide area of) of the PLMN's coverage (e.g., a city, a state, and/or a province). The Region-level DRID may be used by the WTRU/PLMN as an intermediate level of granularity between an Area-level DRID and a PLMN-level DRID when performing disaster inbound roaming. PLMN A may accept disaster inbound roamers in all or part of a such Region when affected by a disaster condition (e.g., may start broadcasting one or more associated Region-level DRIDs based on information received from PLMN D and/or local authorities). The WTRU may select a PLMN (e.g., the PLMN A) based on a matching of the DRID or a matching of a portion of the DRID (e.g., MCC+DRC) broadcast by the PLMN A with an allowed Region-level or PLMN-level DRID. The WTRU may register for inbound roaming with the PLMN A providing a protected Region-level or PLMN-level DRID to be authorized for inbound roaming by the HPLMN.

In certain representative embodiments, methods, systems, apparatus, and procedures may be implemented for notification of a disaster condition to the WTRU. For example, methods, systems, apparatus, and procedures may be implemented to deliver/send information on the disaster condition of a PLMN in an area to the WTRU located in the area. As another example, methods, systems, apparatus, and procedures may be implemented to integrity protect, replay protect and/or confidentiality protect the information of the disaster condition of the PLMN. As a third example, methods, systems, apparatus and procedures may be implemented to determine the type/kind of information to be delivered/sent to the WTRU (for example) based on, for example, any of: the disaster condition, the number of WTRUs effected by the disaster condition, the services/applications executing on the WTRU, the network slices used by the WTRU, the mobility of the WTRU (e.g., connection capabilities of the WTRU), the capabilities of the WTRU (e.g., other connection capabilities, Bluetooth, WLAN, WIFI, among others).

In certain representative embodiments, methods, systems, apparatus, and procedures may be implemented to provide an indication of accessibility from PLMNs (e.g., other PLMNs without a disaster condition) to the WTRU. For example, one or more other PLMNs (e.g., other PLMNs other than the PLMN with a disaster condition) may indicate (e.g., each indicate) that the respective PLMN can accommodate inbound roamers (e.g., inbound roamers from the PLMN with the disaster condition sometimes referred to therein as an inbound disaster roamer (IDR) or IDR WTRU. In certain representative embodiments, information may be provided to IDRs (e.g., potential IDR WTRUs).

Representative Procedures for Registration to the Roaming PLMN Without Disaster Condition In certain representative embodiments, methods, systems, apparatus, and procedures may be implemented to perform a registration procedure initiated by DIRs (e.g., IDR WTRUs).

In certain representative embodiments, methods, systems, apparatus, and procedures may be implemented to authenticate IDRs. For example, a home network may be unavailable for "normal" roaming authentication and authorization) WTRUs. It is contemplated that such WTRUs may be sometimes referred to as refugee WTRUs. For example, refugee WTRUs (e.g., all "refugee WTRUs) may be any of: (1) one or more non-roaming WTRUs with a serving network that may be the same as their home network (e.g., these WTRUs may not or cannot roam to another PLMN since the CN cannot authenticate them). This situation may occur when a main database, (e.g., a Unified Data Management (UDM)//Home Subscriber Server (HSS) in a Home PLMN is not reachable; and/or (2) one or more inbound roaming WTRUs that may roam to other PLMNs and be authenticated on that other PLMN. This situation occurs when an anchor node in the CN (e.g., Access and Mobility Management Function (AMF)/Mobility Management Entity (MME) may be not operating properly (e.g., is down).

In certain representative embodiments, methods, apparatus and procedures may be implemented to register a WTRU in a PLMN (e.g., PLMN A) that provides service to inbound roamers, when a disaster occurred in the PLMN (PLMN D) during or just prior to registration in the PLMN D.

In certain representative embodiments, methods, systems, apparatus, and procedures may be implemented to enable a PLMN (e.g., a disaster PLMN or a disaster roaming PLMN) to limit the area of service to IDR WTRUs to a region where a disaster condition applies.

In certain representative embodiments, methods, systems, apparatus, and procedures may be implemented to allow a WTRU that did not manage to register in the PLMN D, (e.g., since a disaster condition occurred in the PLMN D during or just prior to the registration) to register in another PLMN (e.g., the PLMN A) that can provide service to inbound roamers.

In certain representative embodiments, methods, systems, apparatus, and procedures may be implemented to ensure that an inbound roamer resided (e.g., actually resided) in a disaster area of the PLMN D when the disaster occurred.

Representative Procedures for Notification that Disaster Condition is No Longer Applicable to the WTRUs In certain representative embodiments, methods, systems, apparatus, and procedures may be implemented to deliver/send (and/or when to) information that a disaster condition is no longer applicable to one or more IDR WTRUs.

In certain representative embodiments, methods, systems, apparatus, and procedures may be implemented for one or more IDR WTRUs to perform network selection when notified that a disaster condition is no longer applicable.

Representative Procedures for Prevention of Signaling Overload in PLMNs without a Disaster Condition In certain representative embodiments, methods, systems, apparatus, and procedures may be implemented to stagger an arrival of WTRUs in PLMNs without a disaster condition, for example to spread out registration attempts over time and/or to keep the number of WTRUs attempting to register simultaneously within a manageable limit (e.g., a threshold level).

In certain representative embodiments, methods, systems, apparatus, and procedures may be implemented to enable a PLMN without a disaster condition to prevent (e.g., efficiently prevent) IDR WTRUs from attempting registration on the PLMN when the PLMN can no longer accept IDR WTRUs, for example due to congestion.

Representative Procedures for Prevention of Signaling Overload by Returning WTRUs to the PLMN Previously with Disaster Condition In certain representative embodiments, methods, systems, apparatus, and procedures may be implemented to stagger a return of the WTRUs to the PLMN previously with a disaster condition, for example to spread out registration attempts over time and/or to keep the number of WTRUs attempting to register simultaneously within a manageable limit (e.g., a threshold level).

Representative Procedures for Outbound Roaming WTRUs

In certain representative embodiments, methods, systems, apparatus, and procedures may be implemented to provide the outbound WTRUs notifications of the disaster in their Home Network (HN).

In certain representative embodiments, methods, systems, apparatus, and procedures may be implemented to enable the outbound WTRUs to get (e.g., perform) re-authentication in the Serving Network (SN) during outbound roaming. For example, an AT&T WTRU may roam on another network (China Mobile (CMCC) network in People Republic of China (PRC). The WTRU can (re)-register if there is a disaster condition in its HN, (e.g., the AT&T UDM is on fire).

Representative Architecture/Implementation for Disaster Response Management

In certain representative embodiments, a network function referred to herein as a Disaster Response Function (DRF) may be implemented. The DRF may provide, for example, an abstraction to the rest of the 3GPP System, to support Disaster Response Management functionality/procedures/operations. Some of the DRF functionality/procedures/operations may be co-located with existing functions (e.g., UDM and/or Policy Control Function (PCF), among other). The DRF may include support for the following functionality/procedures/operations (e.g., provided on the service-based architecture and/or via the user plane) including any of:

(1) Support to maintain disaster condition related information including, for example: (i) a start of the disaster condition (e.g., a start time/date), (ii) an end of the disaster condition, (iii) an area where the disaster condition applies, (iv) a list of the same country roaming partners PLMNs supporting IDR WTRUs, (v) a list of affected WTRUs (for example, it is contemplated that a trigger for start or end of disaster condition may be provided by functions/means outside of the DRF (e.g., by the Mobile Network Operator (MNO) network management system).

(2) Selection and/or notification of the start and/or the end of the disaster condition to the relevant roaming partners (for example, the DRF in or associated with an affected PLMN may inform one or more DRF in or associated with one or more other PLMNs without a disaster condition and may provide information about the areas affected by the disaster condition.

(3) Selection and/or notification of the start and/or the end of the disaster condition to a relevant Network Function (NF) within the PLMNs with and without a disaster condition and/or to the WTRU (e.g., encountering the disaster condition, or afterward as an IDR WTRU). For example, the DRF may any of:

(i) in or associated with a PLMN with a disaster condition, notify the AMFs of the start/end of the disaster condition to notify the affected WTRUs and/or the NG-RAN accordingly;

(ii) in or associated with a PLMN without the disaster condition, may map the disaster-affected area (e.g., geographical coordinates) from the affected PLMN to cell areas and one or more serving AMFs and/or may notify the one or more AMFs about the start/end of disaster condition which may, in turn, notify the IDR WTRUs and/or NG-RAN, accordingly.

(4) A Serving NF Registration Management of the IDR WTRU in the PLMN without a disaster condition may store the serving AMF in the PLMN without the disaster condition for the roaming WTRU.

(5) Support for Access Authorization for IDR WTRUs based on disaster condition related information (for example, whether a particular WTRU is allowed to register due to disaster roaming (e.g., the DRF may determine/check if a disaster condition applies for the WTRU in the given area and/or may check/determine whether to limit the number of IDR WTRUs (e.g., based on a limit/threshold on the number of IDR WTRUs allowed).

(6) The DRF may control (e.g., be in charge of) assigning identities in relation to disaster management functionality. For example, a particular disaster condition may be assigned a unique incident id (e.g., unique within the PLMN affected) by the DRF. The incident id may be used to correlate the start and/or the end of a particular disaster condition, for PLMN selection that supports IDR WTRUs. The same PLMN may be subject to one or more disaster conditions (e.g., in different regions) and the DRF may assign different incident ids, accordingly (e.g., based on various impacted areas). A WTRU that performs Inbound disaster roaming may be assigned an inbound roaming id that may be used to track inbound roamers (e.g., for update/notification about a disaster condition), for charging purposes, when a disaster condition applies.

Figure 2:
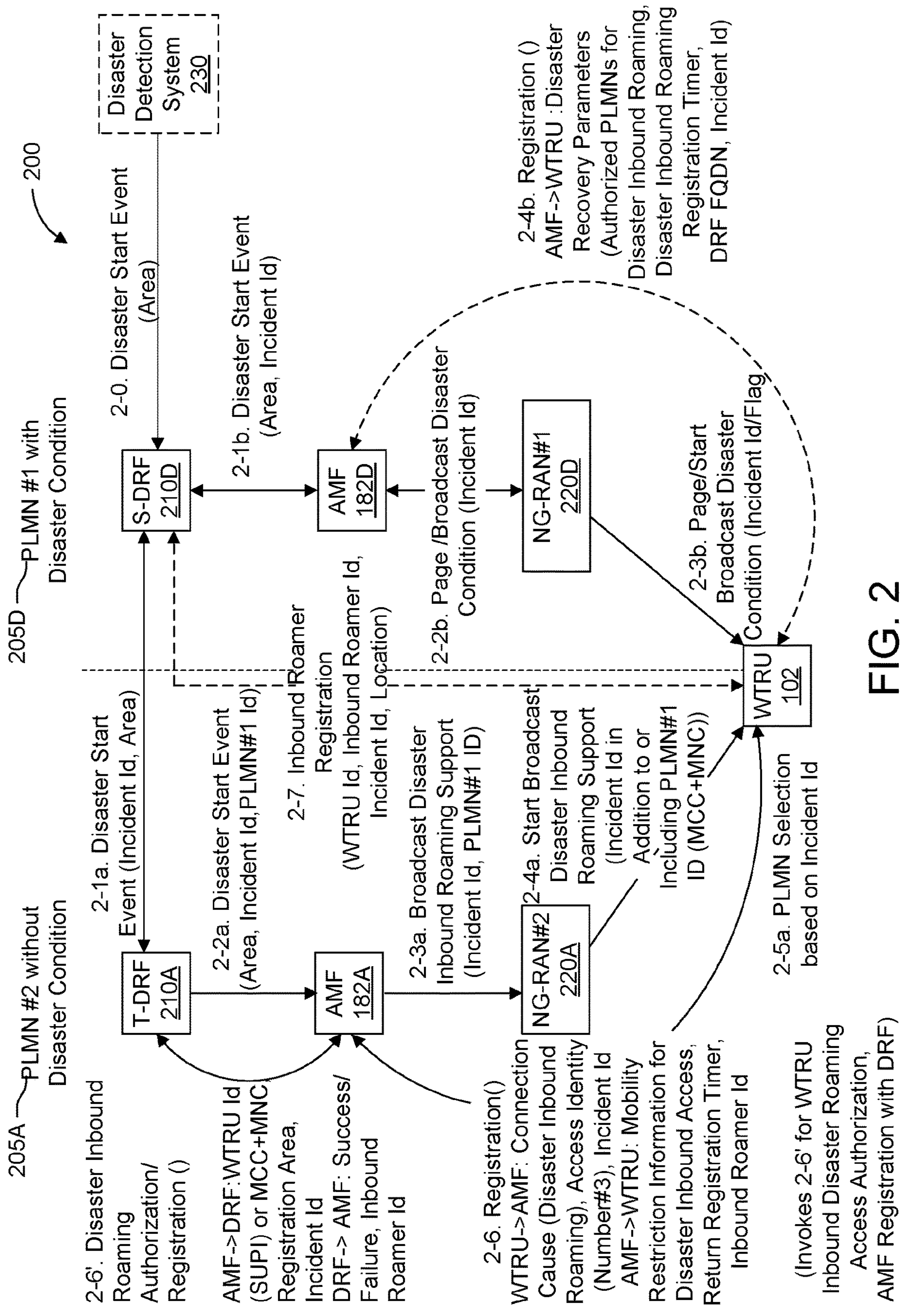
FIG. 2 is a diagram illustrating a Disaster Response Scenario whereby a Disaster Response Function (DRF) enables a notification of the WTRU and roaming partner about a start of a disaster condition and authorization for a WTRU to register into a PLMN without a disaster condition.

FIG. 2 is a diagram illustrating a Disaster Response Scenario 200 whereby the DRF may enable a notification of the WTRU and roaming partner about a start of a disaster condition and authorization for a WTRU to register with a PLMN without a disaster condition (e.g., which is itself not experiencing a disaster condition, for example to inform the WTRU of the start of disaster condition in another PLMN and/or to select and register the WTRU with such a PLMN without disaster condition).

Referring to FIG. 2, a first PLMN 205D (e.g., a PLMN #1 and/or source PLMN) may have, may use, may be served by, and/or may be associated with a first DRF 210D, a first AMF 182D and/or a first Next Generation (NG)-Radio Access Network (NG-RAN) 220D. A second PLMN 205A (e.g., a PLMN #2 and/or target PLMN) may have, may use, may be served by, and/or may be associated with a second DRF 210A, a second AMF 182A and/or a second NG-RAN 220A). The first PLMN 205D may be experiencing or be determined to have a disaster condition and a second PLMN 205A (e.g., a PLMN #2) may not be experiencing or be determined to not have a disaster condition. The first DRF 210D, for example, may be a DRF associated with the source PLMN 205D serving a WTRU 102). The second DRF 210A, for example, may be a DRF associated with the target PLMN 205A that may subsequently serve the WTRU 102.

A disaster detection system/entity 230 may send to the first DRF 210D, at operation 2-0, information indicating a disaster start event associated with the first PLMN 205D and an area/location of the first PLMN 205D associated with the event. At operation 2-1*a*, the first DRF 210D may communicate with the second DRF 210A (e.g., at least one DRF) to provide information indicating the disaster start event including, for example an incident identifier and/or the area/location associated with the event. At operation 2-1*b*, the first DRF 210D may communicate with the first AMF 182D to provide information indicating the disaster start event including, for example, the incident identifier and/or the area/location associated with the event.

At operation 2-2*a*, the target DRF 210A may send, to the second AMF 182A, information indicating the disaster start event associated with the first PLMN 205D including the area/location of the first PLMN 205D associated with the event, the incident identifier associated with the disaster start event and/or a PLMN identifier associated with the first PLMN 205D (e.g., the PLMN experiencing/having the disaster condition). At operation 2-2*b*, the first AMF 182D may send, to the first NG-RAN 220D, information indicating to page and/or broadcast the disaster condition including the incident identifier.

At operation 2-3*a*, the second AMF 182A may send, to the NG-RAN 220A, information indicating to broadcast disaster inbound roaming support including the incident identifier and/or the PLMN identifier associated with the first PLMN 205D. At operation 2-3*b*, the first NG-RAN 220D may page and/or start broadcasting, to the WTRU 102, the disaster condition including the incident identifier and/or a flag.

At operation 2-4*a*, the second NG-RAN 220A may start broadcasting disaster inbound roaming support including the incident identifier and/or the PLMN identifier associated with the first PLMN 205D (e.g., the Mobile Country Code (MCC) and/or the Mobile Network Operator (MNC)). At operation 2-4*b*, the first AMF 182D and the WTRU 102 may communicate information to register the WTRU 102 with the first PLMN 205D. The information may indicate disaster recovery parameters including, for example, any of: (1) one or more authorized PLMNs for disaster inbound roaming, (2) a disaster roaming registration time value (e.g., a registration timer value), (3) a DRF Fully Qualified Domain Name (FQDN) and/or (4) the incident identifier, among others.

At operation 2-5*a*, the WTRU 102 may select the second PLMN 205A (e.g., as the target PLMN) based on the incident identifier associated with the disaster event. At operation 2-6, the WTRU 102 and the second AMF 182A may communicate. For example, the WTRU 102 may send registration information, to the second AMF 182A, to register the WTRU 102. The registration information may indicate any of: (1) a connection cause (e.g., disaster inbound roaming), (2) an access identity and/or (3) the incident identifier, among others. After, or in respond to the sent registration information, the second AMF 182A may send, to the WTRU 102, any of: (1) mobility restriction information for disaster inbound access, (2) a return registration value (e.g., a return registration timer value) and/or (3) an inbound roamer identifier, among others.

At operation 2-6', the second DRF 210A and/or the second AMF 182A may invoke inbound disaster roaming access authorization for the WTRU 102 and/or AMF registration with the second DRF 210A. For example. the second DRF 210A and the second AMF 182A may communicate and the second AMF 182A may send to the second DRF 210A, an authorization/registration message (e.g., a disaster roaming authorization/registration message) including information indicating any of: (1) the WTRU ID, (2) the MCC and/or the MNC, (3) a registration area, and/or (4) the incident identifier, among others. After or in response to the authorization/registration message, the second DRF 210A may send information indicating authorization/registration success or authorization/registration failure and the inbound roamer identifier. At operation 2-7, the WTRU 102 and the first DRF 210D may communicate to re-register the WTRU 102 with the first PLMN 205D (e.g., after the disaster condition ends). For example, the WTRU 102 may send to the first DRF 210D, an inbound roamer registration message indicating any of: (1) the WTRU ID, (2) the inbound roamer identifier, (3) the incident identifier, and/or (4) a location of the WTRU 102, among others.

In certain representative embodiments, an AMF 182D may interact directly with a source DRF 210D (S-DRF) in a PLMN 205D (e.g., a Home PLMN (HPLMN)) with a disaster condition (e.g., in a shared RAN infrastructure with common cell areas). In some embodiments, the WTRU 102 may register with a DRF 210 over a user plane to receive direct notifications/updates about the disaster conditions (e.g., via an end of disaster condition notification, and/or an indication of when to re-select/re-register back with the PLMN 205A that was under a disaster condition, among others). For the WTRU 102 that may not have a user plane (user plane connection), the WTRU 102 may be able to register with the DRF 210 with a Control Plane (CP) PDU session. For example, the DRF 210 may send one or more indications and/or information to the WTRU 102 via the CP PDU session. In certain representative embodiments, the WTRU 102 may interact with the DRF 210 over the Control Plane (CP) using NAS signaling transporting Disaster Management message containers. In certain representative embodiments, the WTRU 102 may receive a list of PLMNs 205D and 205A, etc. authorized for Inbound Disaster Roaming (IDR) to be used if a disaster condition happens. The WTRU 102 may receive during that procedure an IDR ID to enable IDR PLMN selection, when performing inbound disaster roaming. The WTRU 102 may receive this information during a registration or WTRU configuration procedure (with PLMN #1 in FIG. 2). The first PLMN 205D (e.g., PLMN #1) may generate a fresh IDR ID periodically towards the registered WTRU 102 and the IDR PLMNs partners. The IDR PLM partners may associate the IDR ID with the PLMN #1 ID (e.g., Mobile Country Code (MCC) and/or Mobile Network Operator (MNC)). The IDR ID may be used as a pseudonym for a PLMN ID to preserve confidentiality of that PLMN 205A when experiencing a disaster condition (e.g., the IDR ID may be associated with one or more incident ids tracking particular incidents as shown in FIG. 2). For example, when the WTRU 102 detects a disaster condition in the first PLMN 205D (e.g., PLMN #1 in FIG. 2) (e.g., from an indication in a broadcast or paging message or by detecting an absence of first PLMN cells or due to an abnormal de-registration from the first PLMN 205D), the WTRU 102 may initiate a PLMN selection procedure using the above list of PLMNs 205 authorized for inbound disaster roaming and may select a cell (e.g., in the second PLMN 205A (e.g., PLMN #2 in FIG. 2) on the condition that such a cell broadcasts a matching IDR ID.

Figure 3:
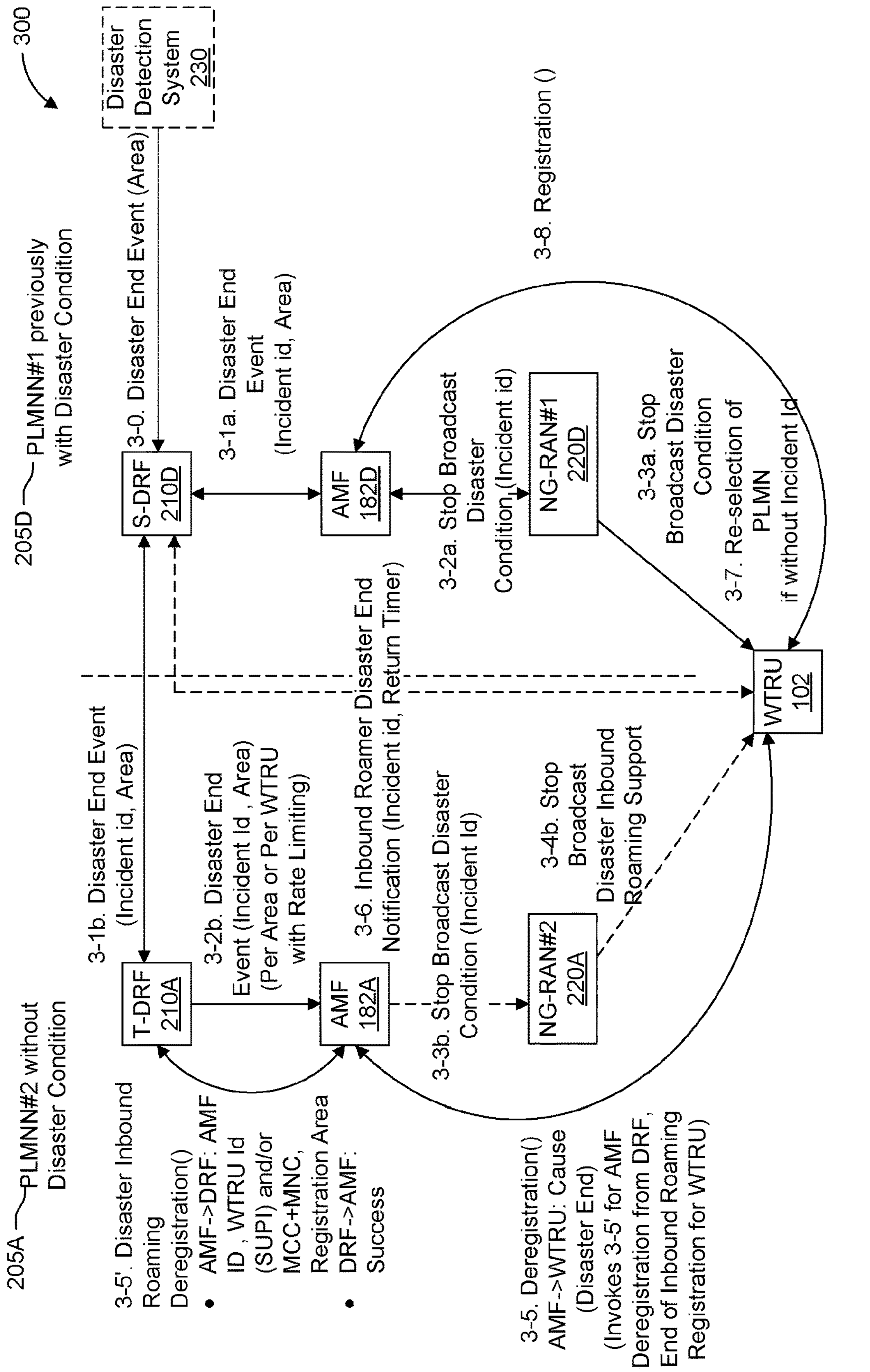
FIG. 3 is a diagram illustrating a Disaster Response Scenario whereby the DRF enables the notification of the WTRU and roaming partner about an end of the disaster condition.

FIG. 3 is a diagram illustrating a Disaster Response Scenario 300 whereby the DRF enables the notification of the WTRU and roaming partner about an end of the disaster condition (e.g., to inform the WTRU of the end of disaster condition and/or to return to the PLMN previously with the disaster condition).

Referring to FIG. 3, the first PLMN 205D (e.g., the PLMN #1) may have, may use, may be served by, and/or may be associated with the first DRF 210D, the first AMF 182D and/or the first Next Generation (NG)-Radio Access Network (NG-RAN) 220D. The second PLMN 205A (e.g., the PLMN #2) may have, may use, may be served by, and/or may be associated with the second DRF 210A, the second AMF 182A and/or the second NG-RAN 220A). The first PLMN 205D may: (1) have previously experienced or (2) been determined to have previously experienced a disaster condition (e.g., which has now ended). The second PLMN 205A (e.g., the PLMN #2) may: (1) not be experiencing, (2) not have previously experienced, (3) be determined to not have not experienced; and/or (4) be determined to not have previously experienced a disaster condition. The first DRF 210D, for example, may be a DRF associated with the first PLMN 205D having previously served the WTRU 102 prior to the disaster condition. The second DRF 210A, for example, may be a DRF associated with the second PLMN 205A that may be subsequently serving the WTRU 102 after the disaster condition ends. The procedure may be used to re-register the WTRU 102 with the first PLMN 205D after the disaster condition ends in the first PLMN 205D.

A disaster detection system/entity 230 may send to the first DRF 210D, at operation 3-0, information indicating a disaster end event associated with the first PLMN 205D and an area/location of the first PLMN 205D associated with the event. At operation 3-1*a*, the first DRF 210D may communicate with the first AMF 182D to provide information indicating the disaster end event including, for example, the incident identifier and/or the area/location associated with the event. At operation 3-1*b*, the first DRF 210D may communicate with the second DRF 210A (e.g., at least one DRF) to provide information indicating the disaster end event including, for example an incident identifier and/or the area/location associated with the event.

At operation 3-2*a*, the first AMF 182D may send, to the first NG-RAN 220D, information indicating to stop the page and/or the broadcast of the disaster condition including the incident identifier. At operation 3-2*b*, the target DRF 210A may send, to the second AMF 182A, information indicating the disaster end event associated with the first PLMN 205D including the area/location of the first PLMN 205D associated with the event, and/or the incident identifier associated with the disaster end event. For example this information may be indicated on: (1) a per area/location basis, and/or (2) a per WTRU basis (e.g., with or without rate limiting for example to reduce congestion of WTRUs 102 transitioning back to the first PLMN 205D.

At operation 3-3*a*, the first NG-RAN 220D may stop paging and/or stop broadcasting, to the WTRU 102, information indicating the disaster condition. At operation 3-3*b*, the second AMF 182A may send, to the NG-RAN 220A, information indicating to stop the broadcast of disaster inbound roaming support including the incident identifier of the disaster end event.

At operation 3-4*b*, the second NG-RAN 220A may stop broadcasting information indicating disaster inbound roaming support. At operation 3-5, the second AMF 182A and the WTRU 102 may communicate information to deregister the WTRU 102 with the second PLMN 205A. The deregistration information from the second AMF 182A may indicate a disconnection cause (e.g., disaster end). At operation 3-5' a procedure may be invoked for the second AMF 182A to be deregistered from the second DRF 210A and may end the inbound roaming registration of the WTRU 102 with the second PLMN 205A. For example, at operation 3-5', a disaster inbound roaming deregistration procedure may be completed in which the second AMF 182A may send, to the second DRF 210A, information indicating any of: (1) an AMF ID, (2) the WTRU id (e.g. the SUPI and/or the MCC/MNC) and/or (3) the registration area, among others. The second DRF 210A may send information indicating a successful deregistration.

At operation 3-6, the first DRF 210D may send to the WTRU 102 notification information indicating an inbound roamer disaster end and may include the incident identifier and/or a return time value (e.g., a return timer value). At operation 3-7, the WTRU 102 may re-select to the first PLMN 205D, if the PLMN does not have an incident id associated with an ongoing disaster (e.g., a current disaster condition). At operation 3-8, the first AMF 182D and the WTRU 102 may communicate information to register (e.g., reregister) the WTRU 102 back with the first PLMN 205D. The timing of the registration may be based on the return time value.

In certain representative embodiments the AMF may interact directly with the S-DRF in the PLMN previously under the disaster condition instead of with a target DRF (T-DRF). In some embodiments, the WTRU may receive direct notification from a DRF over the user plane about the disaster condition (e.g., via an end of disaster condition notification, and/or an indication of when to re-select/re-register back with the PLMN that was under the disaster condition, among others). The WTRU may be de-registered by the AMF from the PLMN without the disaster condition indicating: (1) the end of the disaster condition, and/or (2) parameters to control when the WTRU can register back to PLMN that was under the disaster condition.

In both scenarios illustrated by FIGS. 2 and 3, the WTRU upon registering its HPLMN (e.g., PLMN1) may receive an indication from the AMF in the Registration Accept message informing the WTRU that the WTRU may establish or needs to establish a user plane connection with the DRF. The Registration Accept message may include information for connecting to the DRF (e.g., an IP address, a FQDN, a DRF name, and/or a DNN, among others). The information may be included or contained in a policy container in the Registration Accept message. The WTRU may receive the indication to connect to the DRF and the corresponding DRF information before or after the registration, for example via a WTRU Configuration Update (WCU) procedure initiated by the network (e.g., a network entity or network function).

Representative Procedures for Notification of the Disaster Condition to the WTRU In certain representative procedures paging may be used to notify the disaster condition to a WTRU. In certain embodiments, during the registration procedure, the network (e.g., the AMF in a 5G standalone system) may inform the WTRU of an identifier (e.g., a "Special ID") that the network (NW) may use in paging messages when paging the WTRU. To protect against attackers, the network may provide the WTRU with a "String" (e.g., a Code) that may be used by the WTRU locally together with the broadcast ID and a known algorithm, which may result in a Permanent ID (e.g., SUPI/IMEI) of the WTRU. Another way of protecting against attackers may be for the network to provide a set of multiple special IDs/numbers to the WTRU (instead of only one). Using this procedure, the network may use any of these IDs/numbers in the paging message and if the WTRU detects a match between the ID/number used in the paging message and any one among the IDs/Numbers it received from the NW during the registration procedure, the WTRU may interpret the paging message as indicating a disaster condition. After one of the members of the ID/number set is used, the WTRU may discard the ID/number and may treat receiving such a number again in a paging message (e.g., a subsequent paging message) as an exception (e.g., and may discard the exception, report the exception, and/or save the exception for further reporting). To make the above idea practical, the NW may send (e.g., have to send) this same ID over all Paging Occasions, over a sufficiently long period (e.g., a long time interval) to make sure that WTRUs (e.g., all WTRUs) in the area are able to receive and determine the ID and to, hence, determine that a disaster condition applies.

In other embodiments, Cell Broadcast and/or MBMS may be used to notify the disaster condition to a WTRU.

In the Registration Accept, the NW may inform the WTRU of a list or a range of PLMNs that the WTRU may try to register on, once the disaster condition applies. The list may be provided/sent/delivered in a priority order. The information may also be received after the registration via the WCU procedure.

Based on a type and/or capabilities of the WTRU (e.g., a regular or smart phone vs a Cellular Internet of Things (CIoT) device), the NW may provide one or more different PLMN lists and other registration information such as NSSAI (e.g., different NSSAI for different types of WTRUs).

Representative Procedures for Providing Indication of Accessibility from Other PLMNs Without Disaster Condition to the WTRU An indication of support may be broadcasted by a RAN in a target PLMN when the WTRU selects that target PLMN. For example, the RAN of a PLMN that is not associated with a disaster condition may indicate the accessibility of the RAN and/or that PLMN to the WTRU via, for example, a broadcast message and/or system information.

Representative Procedures for Registration to the Roaming PLMN without the Disaster Condition When the WTRU registers in the new PLMN, the WTRU may provide, along with any of: a Globally Unique AMF ID (GUAMI), Serving Temporary Mobile Subscriber Identity (S-TMSI), and/or NSSAI, an indication that the registration of an inbound roamer is due to a "disaster condition". Using the information, the RAN may select a particular AMF (e.g., a special AMF) that the operator has designated. To spread the inbound roamers (e.g., IDR WTRUs), the RAN nodes may be configured by the operator to choose different AMF entities. The determination/selection of a particular AMF entity may be based on a geographic area of the IDR WTRU and/or one or more priority orders of the AMFs/IDR WTRUs.

The WTRU may indicate to the new AMF that the WTRU is an inbound roamer due to "Disaster" (e.g., that the inbound roamer is an IDR WTRU). The AMF may run authentication (e.g., trigger an authentication procedure), however, this type of WTRU (e.g., an IDR WTRU) may be automatically authorized to stay here. For example, the AMF may allow/authorize the WTRU to obtain services here based on the WTRU being an inbound Disaster Roamer WTRU, even though the authentication fails.

Upon or after the registration of the IDR WTRU, the IDR WTRU may be provided over a secure channel (e.g., the NAS) with a signed voucher for acceptance at the "other PLMN". This voucher may include or contain any of: e.g., (1) the WTRU identity, (2) the PLMN identity, (3) a maximum duration of service by the "other PLMN", and/or (4) services that may be paid in the future by the original PLMN, among others. The WTRU may send/forward the voucher instead of the SUPI, (1) at registration time to the "other PLMN", and/or (2) after the Initial Registration is rejected and the roaming NW resolves it either using predefined "disaster recovery" agreement with the PLMN affected by the disaster or by looking at the data in the voucher. It is contemplated that for an up-to-date notification of the "other PLMN", a new interface between "Disaster Recovery" entities in the PLMNs (e.g., either PLMN) may be used/needed.

In case authentication cannot be done, for example, because the new PLMN cannot obtain the authentication vectors from the HPLMN of the WTRU (e.g., due to the UDM being unreachable), any of the following procedures may be implemented including:

(1) upon or after reception of the Registration Request, the new NW/PLMN may send a message to the WTRU indicating that the NW cannot obtain the Authentication Vectors for the WTRU (e.g., by defining a new Cause Code in the Registration Reject message sent by the NW to the WTRU). The WTRU may provide the Voucher/Token that the WTRU had received from the HPLMN in a new Registration Accept message. The reception of this "Voucher/Token" may imply/indicate that this WTRU is authorized to register in the new NW; and/or (2) the WTRU may be configured by the HPLMN with one or more algorithms that the WTRU may use in case of registration in another PLMN, for example after a disaster condition applies in the HPLMN. For example, the HPLMN may have an agreement with certain operators in a country and may have informed the operators of one or more algorithms. During the registration, the HPLMN may provide the WTRU with one or several of these algorithms, (e.g., the NW may send an indication of the proper algorithms (e.g., the algorithm number(s)/algorithm identifier(s) along with a random string). When the WTRU starts registration in the new PLMN, the WTRU may provide a permanent ID (IMSI/SUPI) of the WTRU, the indication (e.g., the algorithm number(s)) and the random string. The new NW may run/determine a new AKA procedure using a newly defined Authentication message, based on the selected/determined/chosen algorithm, the permanent ID of the WTRU, and the random string. The output of this process may be the RES and the keys for integrity and ciphering, among others.

Representative Procedures for Inbound roamer registration in PLMN (e.g., without disaster condition with disaster roaming authorization in HPLMN)

A DRF may be deployed in a PLMN (e.g., PLMN D) (with a disaster condition), in another PLMN (e.g., PLMN A) (e.g., which is alive, accepting inbound roamers from PLMN D) and in the WTRU's HPLMN.

When registering with the PLMN D, the WTRU may receive disaster response configuration parameters, including a "provisional" unique Disaster Response Incident ID (DRID) and/or a list of PLMNs authorized to accept inbound roamers from the PLMN D. When the WTRU is notified of a disaster condition in the PLMN D, the WTRU may select another PLMN A based on embodiments described herein. The WTRU registers with PLMN A indicating that the registration is for disaster inbound roaming. The WTRU includes in the registration request message disaster response parameters that may include: the DRID and/or the ID of the PLMN D. If the Registration is successful, the WTRU may receive, from PLMN A, disaster response related parameters (e.g., mobility restriction parameters while using PLMN A, and/or a timer (e.g., value and/or an expirer period, among others) for re-registration to PLMN D, for example when disaster condition ends).

When the PLMN D determines that a disaster condition exists (e.g., encounters the disaster condition), the DRF associated with PLMN D may notify one or more DRFs associated with (e.g., used by) the PLMN A and/or the HPLMN, for example if the PLMN D is different from the HPLMN, about the disaster condition including the DRID. If the PLMN D is different from the HPLMN, the DRF of the HPLMN may be provided by the PLMN D with a list of one or more PLMNs that are authorized for disaster inbound roamers. It is contemplated that the disaster information of the DRF associated with the PLMN D may be obtained from the MNO's Network Management System (NMS) or any other disaster detection capable system. The DRF may be a service provided by the UDM.

Figure 4:
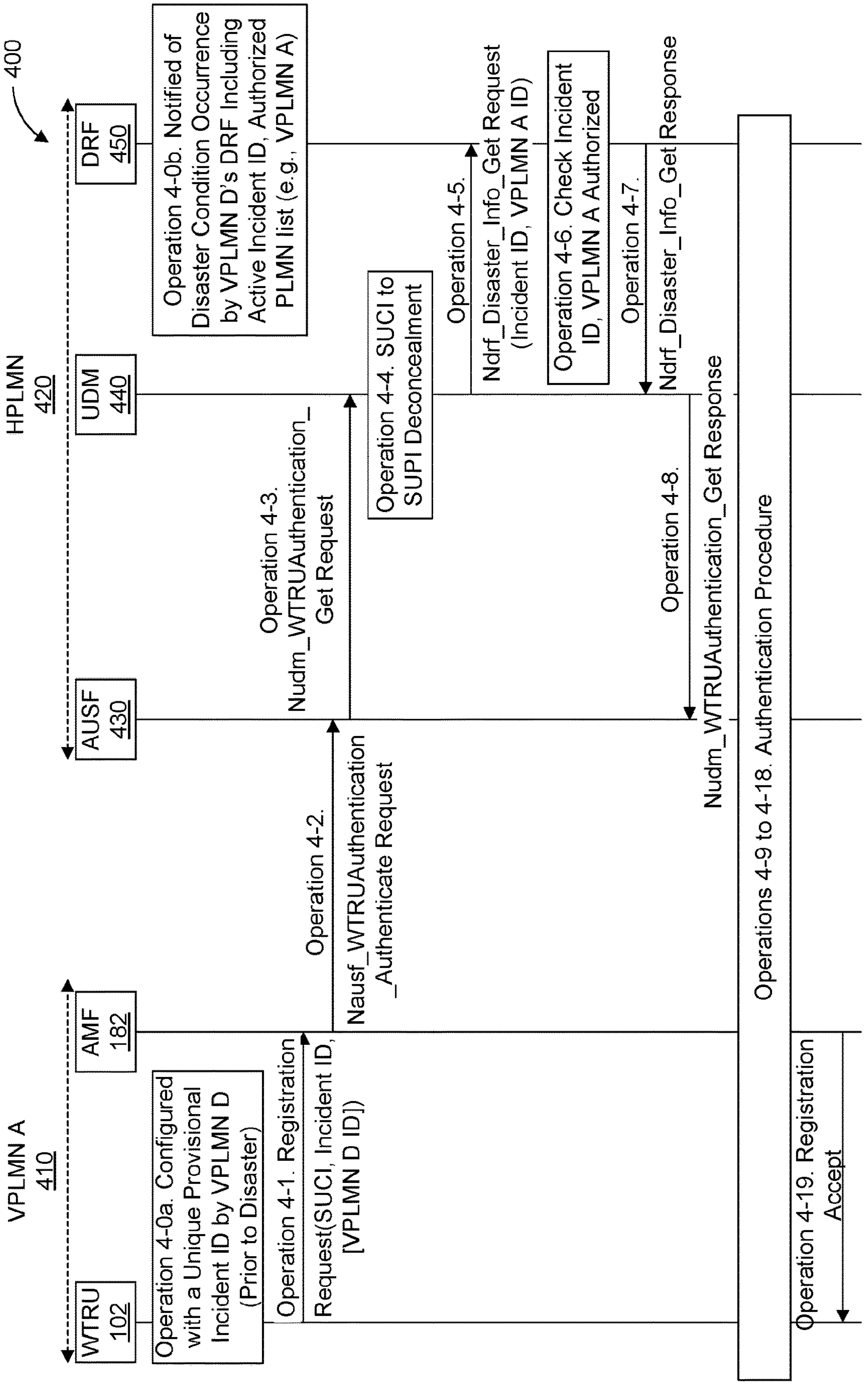
FIG. 4 is a diagram illustrating a registration procedure with a roaming PLMN without Disaster Condition in case of a Disaster Condition.

FIG. 4 is a diagram illustrating a registration procedure 400 with a roaming PLMN without Disaster Condition in case of a Disaster Condition (e.g., the roaming PLMN is not the HPLMN, the roaming PLMN does not have a current disaster condition, and the roaming PLMN may have determined that another PLMN has a disaster condition associated with the other PLMN).

Referring to FIG. 4, the registration procedure 400 may include any of the following operations:

(1) at operations 4-0*a* and 4-0*b*, the WTRU 102 may be configured with a DRID (e.g., a unique provisional DRID) when the WTRU 102 registers with the PLMN D. The configuration information may be received during a Registration (e.g., using a Registration Accept message) or during a WTRU Configuration Update procedure. The WTRU 102 may receive other disaster response parameters such as list of authorized PLMN for inbound roaming (for example, when a disaster condition occurs, the DRF of the PLMN D may notify the DRF of the PLMN A about the disaster (e.g., the disaster condition) and may provide the DRID, and/or other disaster condition information (e.g., such as one or more affected areas). The DRF of the PLMN D may notify the HPLMN to provide the same information and/or the list of PLMNs authorized for inbound roaming (e.g., PLMN A etc.). When the WTRU detects that a disaster condition occurred, the WTRU may be notified that PLMN A is accepting inbound roamers based on PLMN A's ID and the DRID, for example, broadcast PLMN ID of PLMN A may be part of the list of PLMNs authorized to provide disaster inbound roaming service, a DRID broadcast by PLMN A may match the DRID configured in the WTRU. The DRID may be broadcast by selected cells of PLMN A such as to restrict disaster inbound roamer access to those cells (e.g., used in an access control mechanism). The WTRU may perform cell selection based on DRID, for example, the WTRU may camp on a cell if a DRID broadcast by the cell matches the DRID configured in the WTRU. The DRID may be random number and/or may include PLMN D information (e.g., the Mobile Country Code (MCC)+Mobile Network Code (MNC)). The WTRU may select the PLMN A based on the configured list of PLMNs authorized for inbound roaming;

(2) at operation 4-1, the WTRU 102 may send a Registration Request message indicating that this is for a disaster inbound roaming registration and may include the Subscription Concealed Identifier (SUCI) of the WTRU 102, the DRID and/or the PLMM ID of the PLMN D (e.g., the MCC and MNC), (for example, the WTRU 102 may transmit a concealed DRID computed and/or generated using a public key of the HPLMN 420, a same protection scheme and/or a method used for concealing the Subscription Permanent Identifier (SUPI) into the SUCI. The WTRU 102 may omit the DRID in the request message. The NG-RAN may provide the AMF 182 with the DRID(s) supported (e.g., by the cell) when transmitting the request message from the WTRU 102 to the AMF 182);

(3) at operation 4-2, the AMF 182 may send an authentication request to the Authentication Server Function 430 (AUSF) in the HPLMN 420 and may forward the parameters from operation 4-1 along with the PLMN ID of the PLMN A 410;

(4) at operation 4-3, the AUSF 430 may send an authentication request including the above to the UDM 440;

(5) at operation 4-4, the UDM 440 may perform deconcealment of the SUCI into the SUPI using a Subscription Identifier De-concealing Function (SIDF) and using the HPLMN private key as per existing deconcealment procedure (for example, if the received DRID is concealed, the UDM/SIDF 440 may perform deconcealment of the concealed DRID using the same procedure);

(6) at operation 4-5, the UDM 440 may send a request to the DRF including the DRID and the ID of the PLMN (s) (e.g., PLMN A, PLMN D); The UDM 440 may omit the DRID of not provided by the WTRU 102;

(7) at operation 4-6, the DRF 450 may retrieve the disaster response information identified by the DRID and/or PLMN ID or PLMN D and may verify that the PLMN (e.g., PLMN A) is part of the list of authorized PLMNs for inbound roaming;

(8) at operation 4-7, the DRF 450 may send a response to the UDM 440 with a result (e.g., success/failure) indicating whether the WTRU 102 is authorized to perform inbound roaming in the PLMN (e.g., PLMN A) from another PLMN (e.g., PLMN D) The DRF 450 may include a list of applicable/allowed DRID(s) for PLMN D in the response message;

(9) at operation 4-8, the UDM 440 may send authentication vectors and the SUPI to the AUSF 430, as per existing authentication procedure if the DRF 450 sends a successful result (and for example, the UDM 440 may reject the authentication request otherwise);

(10) at operations 4-9 to 4-18, if the UDM/DRF verification is successful, an authentication procedure of the WTRU 102 may be performed between or among the WTRU 102, the AMF 182 and/or the AUSF 430, as per existing authentication procedure (for example the AUSF 430 may provide the AMF 182 with the SUPI and if applicable a deconcealed DRID. The UDM 440 may send a response in the following, whereby a 5G AKA authentication procedure is illustrated (alternatively, an EAP-AKA' procedure may be used)).

(11) at operation 4-9, the AUSF 430 may store an expected Response* (XRES*) temporarily together with the received SUCI or SUPI;

(12) at operation 4-10, the AUSF 430 may generate an authentication vector (AV) (e.g., a 5G AV) from the home environment (HE) AV (e.g., 5G HE AV) received from the UDM/Authentication credential Repository and Processing Function (ARPF) by computing/determining the HXRES* from the XRES* and the $K_{SEAF}$ from the $K_{AUSF}$, and replacing the XRES* with the HXRES* and the $K_{AUSF}$ with the $K_{SEAF}$ in the 5G HE AV;

(13) at operation 4-11, the AUSF 430 may remove the $K_{SEAF}$ returning the Serving Environment (SE) AV (e.g., the 5G SE AV) (based on the RAND, the Authentication Token (AUTN), and/or the HXRES*) to the AMF/SEAF 182 in a Nausf_UEAuthentication_Authenticate Response;

(14) at operation 4-12, the AMF/SEAF 182 may send the RAND and/or the AUTN to the WTRU 102 in a NAS message Authentication Request (for example, this message may include the ngKSI that may be used by the WTRU 102 and/or the AMF 182 to identify the KAMF and the partial native security context that may be created if the authentication is successful. This message may include the Anti-Bidding down Between Architecture (ABBA) parameter. The AMF/SEAF 182 may set the ABBA parameter. The WTRU/mobile equipment (ME) may forward the RAND and the AUTN received in a NAS message Authentication Request to the UMTS Subscriber Identify Module (USIM). The ABBA parameter may be included to enable bidding down protection);

(15) at operation 4-13, at receipt of the RAND and the AUTN, the USIM may verify freshness of the 5G AV, for example by checking whether the AUTN can be accepted (as an example, if it can be accepted, the USIM may determine/compute a response RES. The USIM may return RES, a first key (e.g., CK), and/or a second key (e.g., IK) to the ME. If the US IM computes/determines a Kc (e.g., the GPRS Kc) from the first key (e.g., CK) and the second key (e.g., IK) using a conversion function c3, and sends it to the ME, the ME may ignore the GPRS Kc and not store the GPRS Kc on the USIM or in the ME. The ME may compute/determine the RES* from the RES. The ME may calculate/determine the $K_{AUSF}$ from CK||IK. The ME may calculate the $K_{SEAF}$ from the $K_{AUSF}$. An ME accessing 5G may check during authentication that a “separation bit” in the AMF field of the AUTN is set to 1. The “separation bit” is bit 0 of the AMF field of the AUTN. For example, the separation bit in the AMF field of the AUTN may not be used anymore for operator specific purposes);

(16) at operation 4-14, the WTRU 102 may return the RES* to the AMF/SEAF in a NAS message Authentication Response.

(17) at operation 4-15, the AMF/SEAF 182 may compute/determine the HRES* from the RES*, and the AMF/SEAF 182 may compare the HRES* and the HXRES* (for example, if the HRES* and the HXRES* coincide, the AMF/SEAF may determine/consider that the authentication is successful from the serving network point of view. If the RES* and the HXRES* do not coincide, the AMF/SEAF 182 may proceed. If the WTRU 102 is not reached, and the RES* is never received by the AMF/SEAF 182, the AMF/SEAF 182 may consider/determine that authentication has failed, and may indicate a failure to the AUSF 430);

(18) at operation 4-16, the AMF/SEAF 182 may send the RES*, as received from the WTRU 102, in a Nausf_UEAuthentication_Authenticate Request message to the AUSF 430;

(19) at operation 4-17, when the AUSF 430 receives, as authentication confirmation, the Nausf_UEAuthentication_Authenticate Request message including a RES*, the AUSF 430 may verify whether the AV has expired, (for example, if the AV has expired, the AUSF 430 may consider/determine that the authentication is unsuccessful from the home network point of view. Upon successful authentication, the AUSF 430 may store the $K_{AUSF}$. The AUSF 430 may compare/match the received RES* with the stored XRES*. If the RES* and XRES* are equal, the AUSF 430 may consider/determine that the authentication is successful from the home network point of view. The AUSF 430 may inform the UDM 440 about the authentication result (e.g., to link with the authentication confirmation).

(20) at operation 4-18, the AUSF 430 may indicate to the AMF/SEAF 182 in the Nausf_UEAuthentication_Authenticate Response whether the authentication was successful or not from the home network point of view (for example, if the authentication was successful, the $K_{SEAF}$ may be sent to the AMF/SEAF 182 in the Nausf_UEAuthentication_Authenticate Response. In case the AUSF 182 received a SUCI from the AMF/SEAF 182 in the authentication request and if the authentication was successful, the AUSF 430 may include the SUPI in the Nausf_UEAuthentication_Authenticate Response message. If the authentication was successful, the key $K_{SEAF}$ received in the Nausf_UEAuthentication_Authenticate Response message may become the anchor key (e.g., in the sense of the key hierarchy). The AMF/SEAF 182 may derive the KAMF from the $K_{SEAF}$, the ABBA parameter and/or the SUPI. The AMF/SEAF 182 may provide the ngKSI and the KAMF to the AMF 182. If a SUCI was used for this authentication, the AMF/SEAF 182 may provide (e.g., may only provide) the ngKSI and the KAMF to the AMF 182, after the AMF 182 has received the Nausf_UEAuthentication_Authenticate Response message containing/including the SUPI. In certain embodiments, no communication services may be provided to the WTRU 102 until the SUPI is known to the serving network);

(21) At operation 4-19, upon or after successful registration, the WTRU 102 may receive disaster response parameters to be used while registered with PLMN A and when the disaster condition ends as described herein, the AMF/SEAF 182 may retrieve disaster response information from the DRF (e.g., local and/or in HPLMN/via UDM) such as disaster affected area to derive disaster response parameters (e.g., mobility restrictions while inbound roaming). In other representative embodiments, the AMF 182 may request a list of DRID(s) from the UDM 440/DRF 450 that are allowed/applicable for the PLMN A/PLMN D, following a successfully authentication of the WTRU 102 (e.g., if the AMF 182 receives no DRID during authentication, from the WTRU 102 and/or the AUSF 430). In that case, the AMF 182 may send a request to the UDM 440 providing the SUPI, the PLMN ID of the PLMN D/PLMN A. The UDM 440 may request the DRF 450, as illustrated above, and may send the list of allowed/applicable DRID(s) to the AMF 182 in a response message. The AMF 182 may compare the DRID(s) supported by the NG-RAN as received with the initial message from the WTRU 102 (e.g., herein illustrated above) with the allowed/applicable DRID(s) received from the UDM 440/DRF 450. The AMF 182 may accept the WTRU registration request if one or more of DRID supported by the NG-RAN are part of the allowed/applicable DRID(s). The AMF 182 may reject the WTRU request, providing a cause indicating disaster inbound roaming is not authorized.

Representative Procedures for Enhancements to DRID Based Implementation to Support Disaster Roaming for the WTRU not Registered with PLMN (e.g., PLLM D), or in Vicinity of Disaster Affected Area In some embodiments, the WTRU may not have registered with the PLMN D (with or having a disaster condition) or in the vicinity of a disaster affected area. For example, a WTRU may not have registered with a PLMN (e.g., PLMN D having the disaster condition) when the WTRU is powered up in a disaster affected area or the registration of the WTRU with the PLMN (e.g., PLMN D) does not complete successfully (e.g., due to a disaster condition failure).

Representative Procedures for the WTRU May Use One or More Area-Level DRIDs from the PLMN (e.g., PLMN D) for Disaster Roaming Registration in Another PLMN (e.g., PLMN A)

The WTRU may receive one or more allowed Area-level DRIDs when registering with PLMN D (the PLMN that is to have the disaster condition, e.g., before/prior to the disaster condition). DRID may be composed of or may include a PLMN identifier (PLMN ID) (e.g., a Mobile Country Code (MCC)+Mobile Network Operator (MNC) (MCC+MNC)), Area identifier (AID) and/or a Disaster Recovery Code (DRC). The DRID may be a concatenation of the PLNM ID, AID and DRC (e.g., DRID=PLMN ID+AID+DRC) or may be derived from the PLMN ID, AID and DRC. The AID may identify a geographical area that maps to a part of RAN coverage area of the PLMN D (e.g., the NR-RAN PLMN D's NG-RAN coverage area, for example one or more NG-RAN nodes, and/or one or more Tracking Areas (TA)). The WTRU may be informed by the PLMN D to perform a PLMN search with one or more DRIDs (e.g., during the handover or based on mobility patterns, while the WTRU is moving towards a known disaster affected area). The WTRU may receive an explicit indication from the AMF of the PLMN D to start a cell search with and/or using the one or more DRIDs. The WTRU may select the PLMN A based on a matching DRID or a portion of the DRID that matches (e.g., the DRC) broadcasted by the PLMN A with one or more allowed DRIDs. The WTRU may register for inbound roaming with the PLMN A providing matching protected DRID to be authorized for the inbound roaming by the HPLMN as described herein.

Representative Procedures for the WTRU May Use Region-Level and/or PLMN-Level DRIDs from the HPLMN for Disaster Roaming Registration in PLMN A The WTRU may be configured (by the HPLMN) with one or more allowed Region-level DRIDs and/or an allowed PLMN-level DRIDs associated with a given PLMN (e.g. the PLMN D, as the HPLMN of the WTRU). The PLMN-level DRID may have a composition that is similar to an Area-specific DRID except that the AID may identify a geographical area that maps into the entire PLMN. The Region-level DRID may have a composition that is similar to an Area-specific DRID except that the AID may identify a geographical area that maps a portion (e.g., a wide area of) of the PLMN's coverage (e.g., a city, a state, and/or a province). The WTRU may select PLMN A based on a match with a DRID or a portion of the DRID (e.g., a match to the MCC+DRC) broadcasted by the PLMN A with an allowed Region-level or PLMN-level DRID. The WTRU may register for inbound roaming with the PLMN A providing a protected Region-level or PLMN-level DRID to be authorized for inbound roaming by the HPLMN as described herein.

Representative Network Side Behavior

Figure 5:
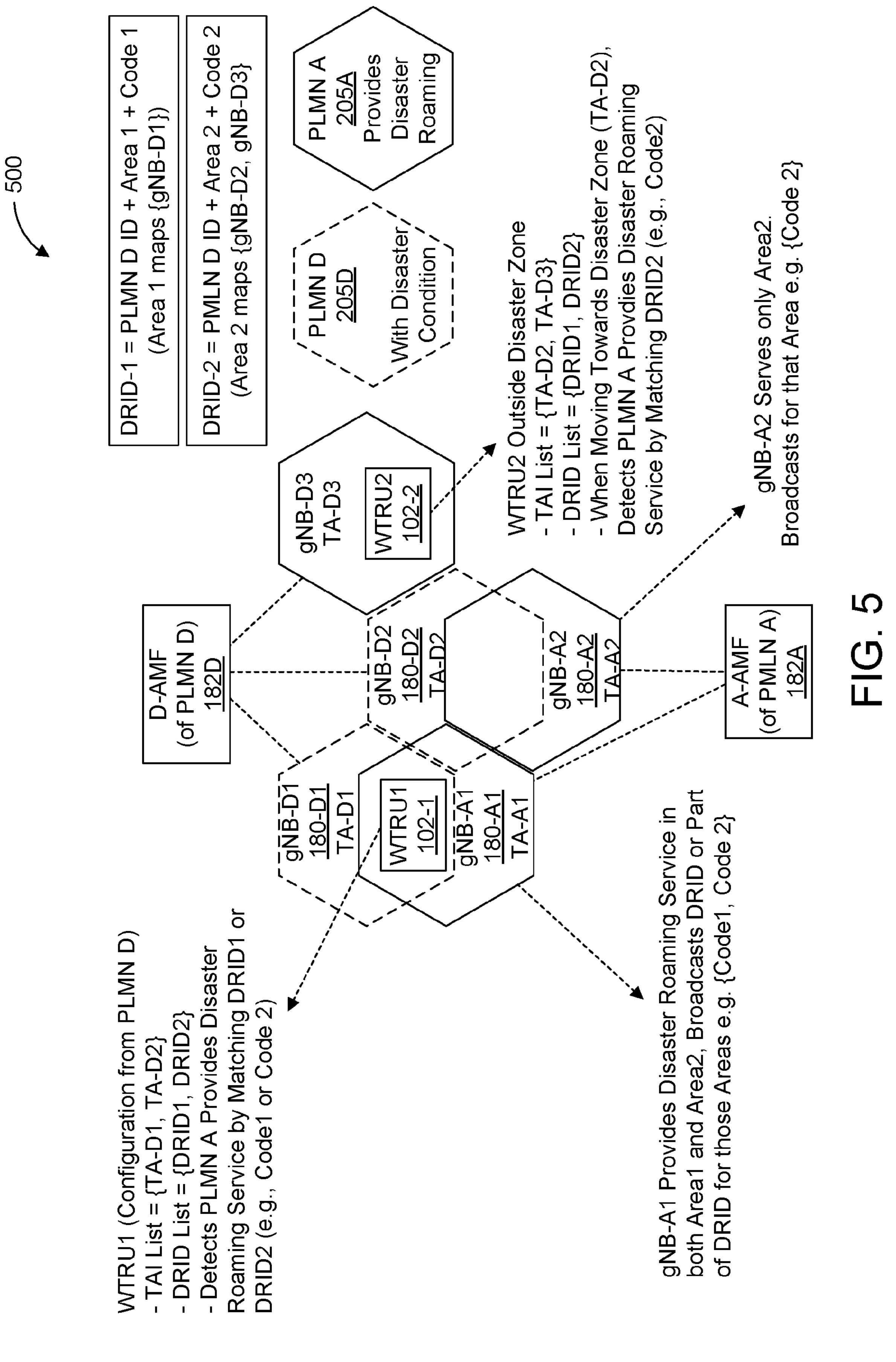
FIG. 5 is a diagram illustrating representative procedures using DRIDs for disaster roaming.

FIG. 5 is a diagram illustrating representative procedures using one or more DRIDs for disaster roaming.

Referring to FIG. 5, a plurality of PLMNs (e.g., a first PLMN 205D which may experience a disaster condition and a second PLMN 205A which may not experience a disaster condition may have overlaid Tracking Areas (TAs), cells and/or gNBs 180. For example, the first PLMN 205D may include a first gNB 180-D1 with a first corresponding TA (e.g., TA-D1), a second gNB 180-D2 with a second corresponding TA (e.g., TA-D2), and a third gNB 180-D3 with a third corresponding TA (e.g., TA-D3). The second PLMN 205A may include a fourth gNB 180-A1 with a fourth corresponding TA (e.g., TA-A1) and a fifth gNB 180-A2 with a fifth corresponding TA (e.g., TA-A2). The TAs of the first PLMN 205D may be offset from the TAs of the second PLMN 205A and/or may have larger or smaller coverage areas/TAs. For example, the fourth TA TA-A1 associated with the fourth gNB-A1 180-A1 may partially overlap with the first TA TA-D1 associated with the first gNB-D1 180-D1 and may partially overlap with the second TA TA-D2 associated with the second gNB-D2 180-D2. The fifth TA TA-A2 associated with the fifth gNB-A2 180-A2 may partially overlap with the second TA-D2 associated with the second gNB-D2.

The control/broadcast signaling of the first PLMN 205D may be provided by D-AMF 182D to the first, second and/or third gNBs 180-D1, 180-D2 and/or 180-D3. The control/broadcast signaling of the second PLMN 205A may be provided by A-AMF 182A to the fourth and/or fifth gNBs 180-A1 and/or 180-A2.

A WTRU1 102-1 may be located in a plurality the coverage area/TAs associated with the first PLMNs 205D and the second PLMN 205A. For example, the WTRU1 102-1 may be located in the first TA TA-D1 and in the fourth TA TA-A1 for possible communication via the first gNB 180-D1 and/or the fourth gNB 180-A1. The WTRU1 102-1 may be configured from the first PLMN 205D.

The fourth gNB-A1 may provide disaster roaming service in areas D1 and D2 of PLMN 205D, and may broadcast DRID or a part of the DRID for these areas (e.g., by broadcasting codes, for example a first code (e.g., Code1) and a second code (e.g., Code 2)). The fifth gNB 180-A2 may provide disaster roaming service in area D2 of PLMN 205D (e.g., only area D2) and may broadcast for that area (e.g. the second code (e.g., only the second code (e.g., Code 2).

The WTRU1 102-1 may be configured with any of: (1) a TAI List, for example including information indicating TA-D1 and/or TA-D2 and/or (2) a DRID List, for example including information indicating DRID1 and/or DRID2. The WTRU1 102-1 may detect that the second PLMN 205A provides a disaster roaming service by matching DRID1 or DRID2 (e.g., Code1 or Code 2) broadcast via the gNBs 180-A1 and/or 180-A2 of the PLMN 205A with the DRIDs from the configured DRID list.

As another example, a second WTRU2 102-2 may be located in a coverage area/TA associated with the first PLMN 205D. For example, the second WTRU2 102-2 may be in the third TA (e.g., TA-D3) for communication via the third gNB (e.g., 180-D3). The second WTRU2 102-2 may be configuration from the first PLMN 205D. The second WTRU 102-2 may be outside the disaster area/zone and may be configured with any of: (1) a TAI List, for example including information indicating TA-D2 and/or TA-D3 and/or (2) a DRID List, for example including information indicating DRID1 and/or DRID2. The second WTRU2 102-2, when moving towards the disaster area/zone (e.g., TA-D2), may detect that the second PLMN 205A provides disaster roaming services by matching DRID2 (e.g., Code 2) broadcast via the gNBs 180-A1 and/or 180-A2 of PLMN 205A with the DRIDs from the configured DRID list.

In certain representative embodiments, DRID information may include a combination of any of: (1) an identifier of a PLMN 205, (2) area information (e.g., area 1 and or area 2), and/or (3) code information (e.g., a code such as code 1). For example, DRID1 may be a combination of: (1) an identifier of the first PLMN 205D, (2) an area identifier (e.g., area 1), and (3) a code (e.g., code 1). As a second example, DRID2 may be a combination of: the identifier of the first PLMN 205D, an area identifier (e.g., area 2) and a code (e.g., code 2). Area 1 may map to the first gNB 108-D1 and area 2 may map to the second and third gNBs 180-D2 and 180-D3.

For example, prior to a disaster condition occurrence, for example when the WTRU1 102-1 registers with the PLMN D 205D, the AMF 182D may provide the WTRU 102-1 with one or more allowed DRIDs (e.g., may provide information indicating the one or more allowed DRIDs) based on any of: (1) a mobility pattern of the WTRU 102, (2) an allocated TAI list, or (3) a size of the area tracked by the DRID etc. and may register the one or more allowed DRIDs with the UDM 440/DRF 450. The AMF 182D may update the WTRU 102 and/or the UDM 440/DRF 450 with the information indicating the one or more allowed DRIDs based on the WTRU mobility. The area identified by DRID is contemplated to be large enough (e.g., covers one or more Tracking areas) to avoid frequent updates of the DRIDs by the AMF 182D.

When a disaster condition occurs, the PLMN D 205D (e.g. the UDM 440/DRF 450 associated with the PLMN D 205D) may provide the PLMN A 205A (e.g. the UDM/DRF associated with the PLMN A 205A) with information about the affected areas (e.g., Area-level DRID (e.g., Area-specific DRID)/Region-level DRID/PLMN-level DRID or portion of the DRID), such as a DRC, and/or geographical coordinates). The PLMN A 205A may indicate that the PLMN A 205A may provide a disaster roaming service for PLMN D 205D by broadcasting any applicable DRIDs (e.g., Area-level/Region-level/PLMN-level DRIDs). The AMF 182A in or associated with PLMN A 205A may obtain the disaster information from the DRF of the PLMN A 205A (e.g., in a form of one or more mapped tracking areas in the PLMN A 205A) and may configure one or more applicable RAN nodes with the supported DRIDs, accordingly. The PLMN D 205D may provide the HPLMN with information about the affected areas (e.g., Area-level DRID (e.g., Area-specific DRID)/Region-level DRID/PLMN-level DRID or portion of the DRID).

When the WTRU 102 registers with the PLMN A 205A for disaster roaming, the AMF 182A may forward the DRID received from the WTRU 102 to the HPLMN as described herein. The AMF 182A may provide (e.g., additionally provide) supported area-level DRID or a portion thereof (e.g., a DRC) as per RAN node configuration described above. This information may be used to assist the UDM/DRF in identifying the current area-level DRID, if or when not available from the WTRU 102. The UDM/DRF may authorize the WTRU 102 authentication to proceed in the PLMN A 205A based on any of: (1) one or more received DRIDs, (2) previous registration information from the PLMN D 205D (e.g., the allowed DRIDs for the WTRU 102), (3) applicable disaster condition information (e.g., disaster affected DRIDs) obtained from the PLMN D 205D and/or (4) supported DRID/DRC from the PLMN A 205A. For example, if the WTRU 102 has no prior registration for the WTRU 102 in the PLMN D 205D, the UDM/DRF may authorize the WTRU authentication, if the WTRU 102 provides a Region-level or a PLMN-level DRID and there is one or more disaster affected areas for the region or PLMN. The UDM/DRF may use the supported DRID information from the PLMN A 205A to determine and to update the current Area-level (e.g., Area-specific DRID)/Region-level DRID, where the WTRU 102 is registering from in PLMN A 205A (e.g., DRF may match the received DRC with a corresponding affected DRID). The AMF 182A in the PLMN A 205A may update the UDM/DRF with the current Area-level/Region-level DRID (or portion thereof, e.g., the DRC) when the WTRU 102 moves across disaster areas under PLMN A coverage.

Representative Procedures to Determine a Last Location of a WTRU in the PLMN with the Disaster, for example, with a Disaster Condition, (e.g., the PLMN D).

In certain examples, the HPLMN (PLMN D) may match (e.g., easily match) a location of the WTRU, based on where the WTRU is in the PLMN A (e.g., now is in PLMN A), and a last known Tracking Area (TA), where the WTRU was registered in the PLMN D. When the WTRU registers to a network, the WTRU may receive a list of TAs and may perform (e.g., only perform) a mobility registration update when the WTRU enters a cell that belongs to a TA which is not in the list of TAs. As an example, it is contemplated that when the WTRU is registered in/by an AMF of the PLMN D, the WTRU was in a first TA (e.g., TA1) and the AMF may send a TA list that includes or consists of information indicating TA1, TA2 and TA3. As such, the WTRU may not have performed a mobility registration update as long as the TA was in any of these three TAs (e.g., TA1, TA2 or TA3). The area granularity using/based on or by means of TAs may be sufficient (e.g., deemed sufficient) for the PLMN A and the PLMN D to verify whether this particular WTRU actually was in the Disaster Area when the disaster occurred. There may not be a need/use for the AMF of the PLMN D to know "exactly" in which TA the WTRU resided before the disaster occurred. In certain representative embodiments, a more specific location of the WTRU may be determined by any of the following:

(1) during a registration procedure, the WTRU and the AMF of the PLMN D may negotiate the use of a NAS message (e.g., a special NAS message) to be communicated when the WTRU changes a TA indicated within a TA List (this may be done by the WTRU sending information indicating one or more WTRU MINT capabilities in a Registration Request message and the AMF informing the WTRU that the WTRU is allowed to and/or is configured to send the special NAS message when the WTRU crosses a border between or among the TAs indicated within the TA List. The special NAS message (e.g., may be and/or may include a Service Request with a specific Service Type (e.g., a new Service Type) that may inform the network (NW) that the service request procedure is to inform (e.g., only to inform) the NW of the location of the WTRU (and, for example is not one or more legacy procedures such as MO Data/Signaling and/or a respond to paging). For example, to make the signaling quick and save resources, the WTRU and the NW may release the signaling connection as soon as the service request procedure is finalized/completed);

(2) as an alternative to sending a Service Request message, the WTRU may use a new NAS message that does not include/contain any valuable information apart from the identity of the WTRU (e.g., the 5G-GUTI of the WTRU) (for example, the use of the special NAS message may be restricted to MINT capable WTRUs only. At the NW side, the reception of this special NAS message may change the mobility management context of the WTRU so that the last registered TA may become the one where the WTRU resides upon sending the message);

(3) the MINT capable WTRU may perform a mobility registration update, upon entering a new TA, even if the new TA belongs to or is associated with the TA List; and/or (4) when the AMF of the PLMN D determines/realizes that the WTRU is capable of MINT, the AMF may not allocate a TA List to the WTRU and may provide (e.g., only provide) one TA in the Registration Accept Message.

Further Representative Procedures for Notification that Disaster Condition is No Longer Applicable to the WTRUs In certain representative embodiments, the notification that a disaster condition no longer exists or is no longer applicable may not be crucial and it is contemplated that the NW may notify/inform the WTRUs when (e.g., only when) the WTRUs are in "Connected Mode". In other representative embodiments, such notifications may occur in Connected Mode and/or RRC Inactive Mode. For example, the NW may send a Configuration Update Command (CUC) message, as part of a WCU procedure to the WTRU, when the WTRU is in Connected Mode or may page the WTRU to bring the WTRU to Connected Mode and may then start the WCU procedure. In both cases, the NW may force the WTRU to perform a registration procedure (for example a conventional procedure). When the WTRU triggers the registration procedure, the NW may reject the Registration Request message with a cause value (e.g., a special cause value) which may guide the WTRU to the HPLMN.

Further Representative Procedures for Prevention of Signaling Overload in PLMNs without Disaster Condition When the WTRU registers in the HPLMN, the AMF may provide a timer (e.g., a timer value) to the WTRU in the Registration Accept message. The WTRU may use this timer value, along with certain parameters of the WTRU and/or local parameters, such as the SUPI and/or the Permanent Equipment Identifier, to derive a "Time Window", over which the WTRU may perform registration to the new PLMN. The RAN may be provided with information by the CN to block/postpone RRC connections from the inbound WTRUs (e.g., IDR WTRUs). The WTRUs may use a new specific Establishment Cause (e.g., "inbound WTRU request due to disaster") when sending an RRC Connection Request. The RAN may provide a new timer in an RRC Connection Reject message, which may push/change a timing of the attempt at a connection/reconnection of the WTRU to the NW to a different time (e.g., a slightly later time). To further randomize the timing for connection/reconnection to the NW, the WTRU may use a formula based on the timer value and the WTRU's own ID.

Figure 6:
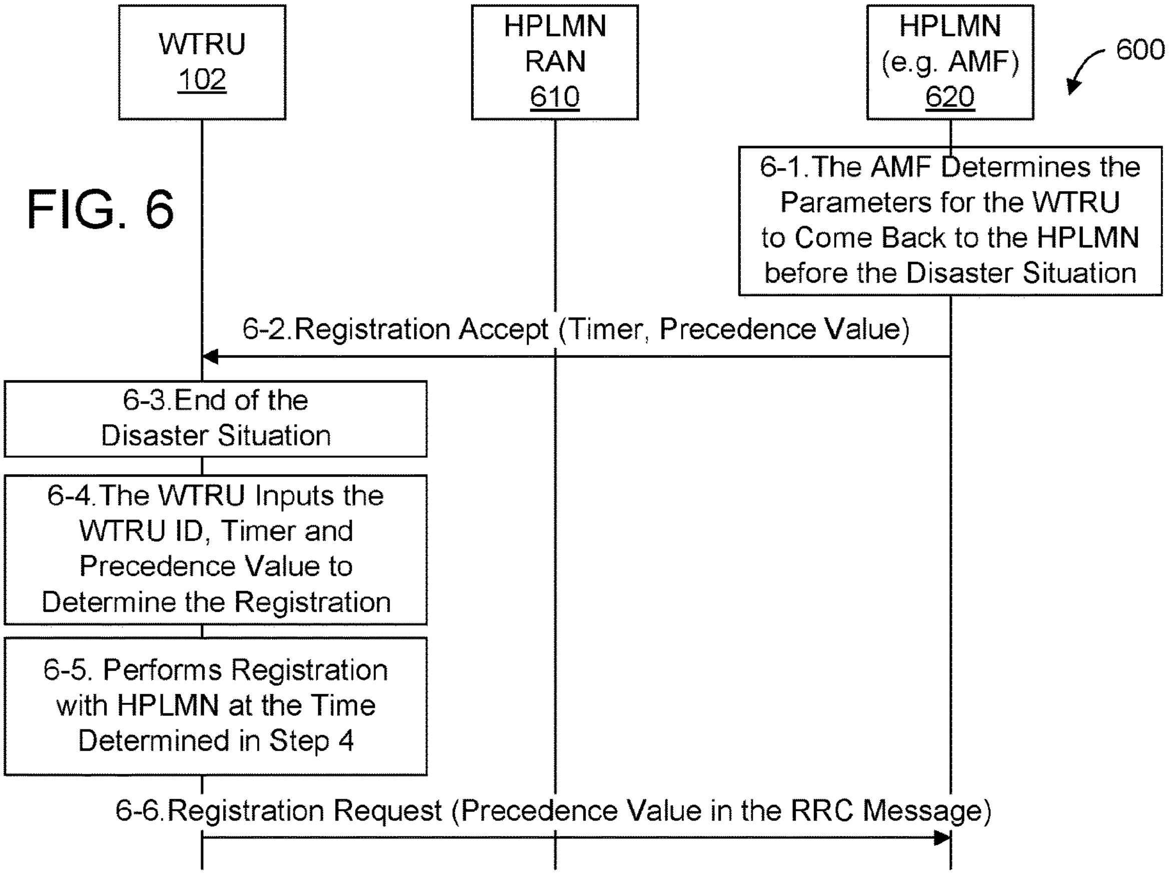
FIG. 6 is a diagram illustrating a representative procedure for determining when to perform registration with HPLMN after a disaster (e.g., a disaster condition)

Further Representative Procedures for Prevention of Signaling Overload by Returning WTRUs in the PLMN Previously with Disaster Condition FIG. 6 is a diagram illustrating a representative procedure for determining when to perform registration with HPLMN after a disaster (e.g., a disaster condition).

Referring to FIG. 6, the representative procedure 600 may include, at operation 6-1, a network entity (NE)/AMF 182 associated with the Home PLMN (HPLMN) 620 determining parameters for the WTRU 102 to come back to (e.g., return to) the HPLMN 620 that served the WTRU 102 before a disaster situation/condition had occur. At operation 6-2, the NE/AMF 182 of the HPLMN 620 may send a message (e.g., a registration accept message) that may include information indicating, for example, a time value and a precedence value. At operation 6-3, the WTRU 102 may determine that the disaster condition/situation has ended. At operation 6-4, the WTRU 102 may determine a registration time based on any of: (1) a WTRU ID, (2) the received time value, and/or (3) the received precedence value. At operation 6-5, the WTRU 102 may perform the registration with the HPLMN 620 at or after the determined registration time. At operation 6-6, the WTRU 102 may send, to the NE/AMF 182 of the HPLMN 620, a registration request that includes information indicating the precedence value in a message (e.g., an RRC message).

For example, the HPLMN 620 may provide a timer value to the WTRU 102 upon registration. This timer (e.g., timer value), along with other WTRU specific parameters such as a WTRU-ID) may be used to determine "when" the WTRU 102 can start registration, when the WTRU 102 may come back (e.g., may return to the HPLMN 620). The HPLMN 620 may provide a "priority/precedence value" to the WTRU 102 upon registration. The WTRU 102 may input the priority/precedence value into an algorithm to determine the time of registration back with the HPLMN 620 that had the disaster condition applied after movement to a PLMN which did not have a disaster condition applied (e.g., movement back from another PLMN to the PLMN that had the disaster condition applied). The WTRU 102 may provide the precedence value in RRC signaling to the RAN 610. The RAN 610 may have been configured by the CN for this and may prioritize the WTRU's request for the registration, for example, based on the precedence value.

Further Representative Procedures for Outbound Roaming WTRUs

The WTRU may roam in any number of geographic areas/countries (e.g., in another country) and a disaster condition may occur in the HPLMN of the WTRU. The Serving NW (e.g., in the other geographic area and/or country) may not be able to re-authenticate the WTRU upon a transition to Connected Mode. To resolve this concern, the WTRU may be configured by the HPLMN with Tokens/Vouchers (e.g., special Tokens/Vouchers) for the case of roaming. When the WTRU registers in a new (e.g., roaming) PLMN, the HPLMN may provide a Token/Voucher to the Serving PLMN. Later, when the WTRU transitions to Connected Mode and the Serving PLMN performs re-authentication of the WTRU but does not have any more Authentication vectors, the NW may send a message, using the secure communication that had been established between the WTRU and the CN, to inform the WTRU that the NW is not able to retrieve authentication vectors due to e.g., communication with HPLMN not being possible. The serving NW may force/cause the WTRU to re-register. Upon re-registration, the WTRU may provide the corresponding Voucher/Token in the Registration Request message.

Figure 7:
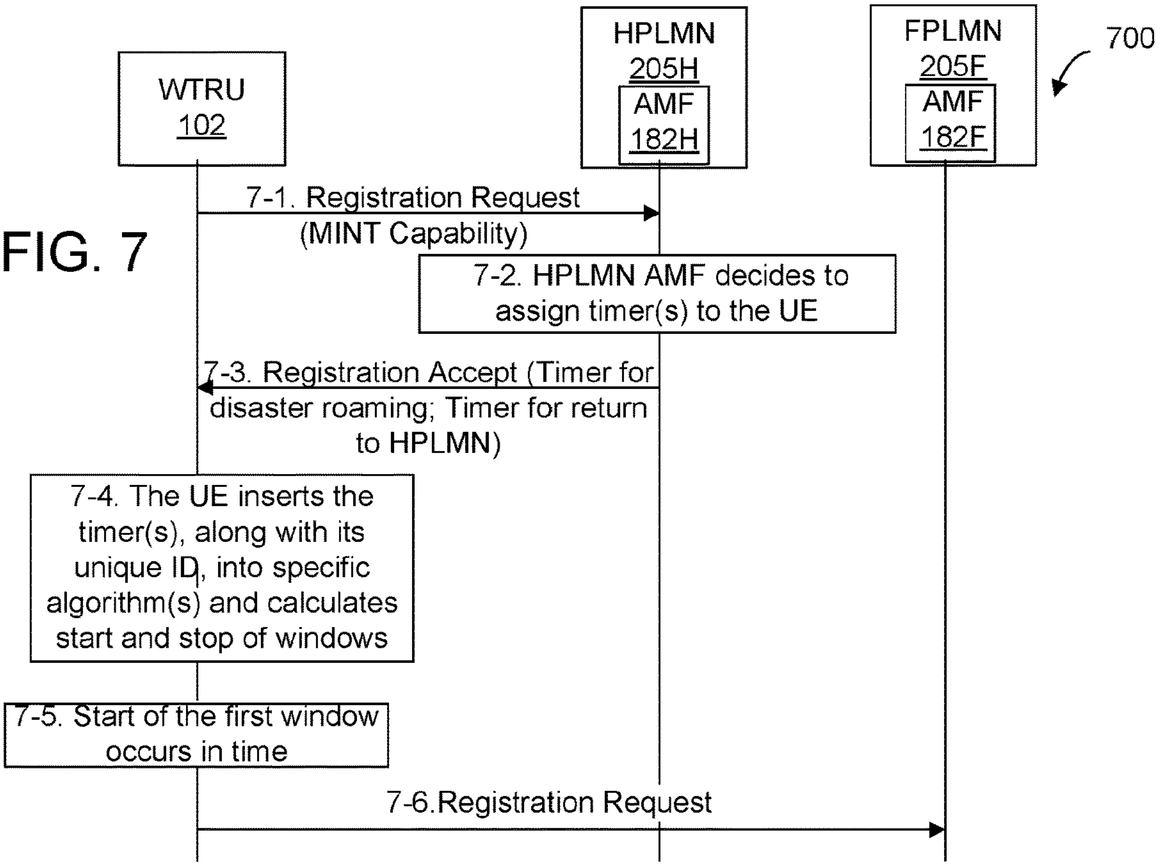
FIG. 7 is a diagram illustrating a representative registration procedure.

FIG. 7 is a diagram illustrating a representative registration procedure.

Referring to FIG. 7, the representative registration procedure 700 may include, at operation 7-1, the WTRU 102 sending to the HPLMN 205H (e.g., a network entity (NE) and/or AMF 182H) a registration request including information indicating WTRU capabilities (e.g., MINT capabilities). At operation 7-2, the NE/AMF 182H may determine to assign one or more time values (e.g., timers) to the WTRU 102. At operation 7-3, the NE/AMF 182H may send to the WTRU 102 a registration accept including a first time value for disaster roaming and/or a second time value for a return to the HPLMN 205H. At operation 7-4, the WTRU 102 may derive start and/or stop times associated with one or more time windows using any of: the first time value and/or the second time value along with a unique identifier of the WTRU 102. The WTRU 102 may determine that the start of a first window has occurred to trigger, for example, at operation 7-6, the WTRU 102 sending a second registration request to a NE/AMF 182F of a second PLMN (e.g., FPLMN 205F.

Figure 8:
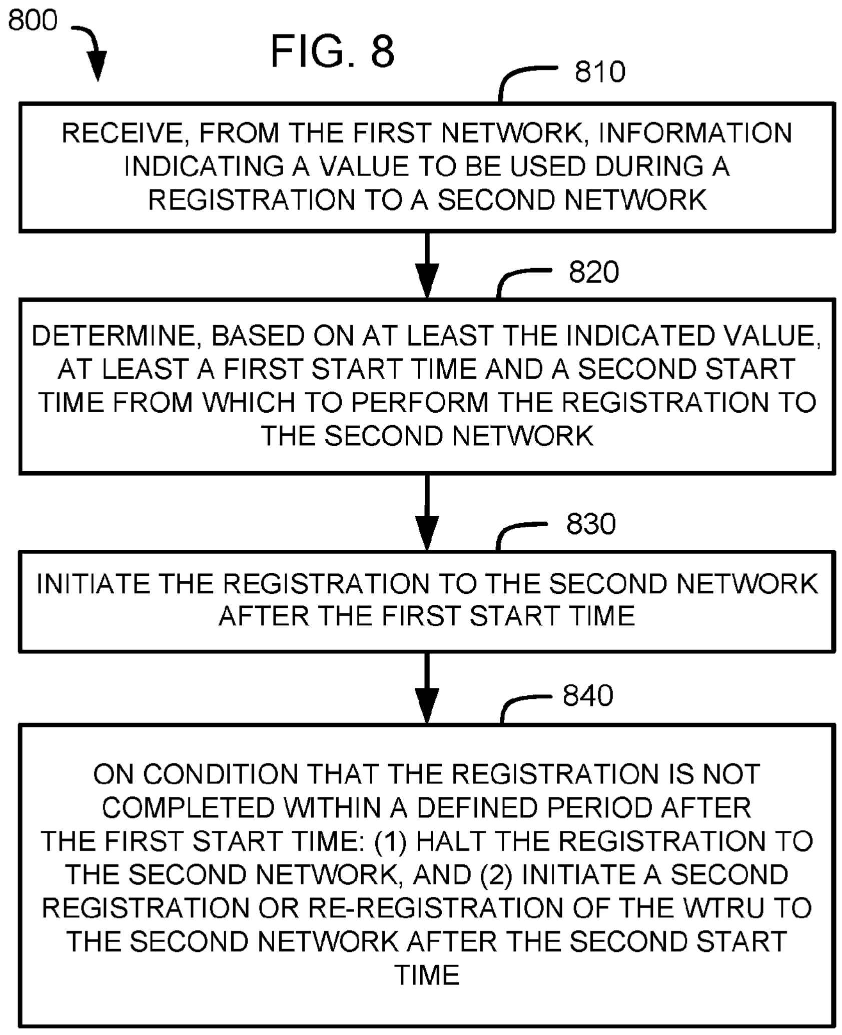
FIG. 8 is a flowchart illustrating a representative method implemented by a WTRU.

FIG. 8 is a flowchart illustrating a representative method implemented by a WTRU.

Referring to FIG. 8, the representative method 800 may include, at block 810, the WTRU 102 receiving from the first network 205D, information indicating a value to be used during a registration to a second network 205A. At block 820, the WTRU 102 may determine, based on at least the indicated value, at least a first start time and a second start time from which to perform the registration to the second network 205A. At block 830, the WTRU 102 may initiate the registration to the second network 205A after the first start time. At block 840, the WTRU 102, on condition that the registration is not completed within a defined period after the first start time, may: (1) halt the registration to the second network 205A, and (2) initiate a second registration or re-registration of the WTRU 102 to the second network 205A after the second start time.

In certain representative embodiments, the received information indicating the value may further indicate a time window and/or the defined period may be based on a duration of the time window.

In certain representative embodiments, the WTRU 102 may determine the time window based on (1) the first start time and (2) one of: an end time or a duration of the first time window based on: (i) the indicated value and any of: (ii) a random value; or one or more parameters specific to the WTRU 102.

In certain representative embodiments the received information may indicate an identifier of the WTRU 102.

In certain representative embodiments, the WTRU 102 may be a disaster roamer. In some examples, the received information may indicate a second value used to determine when the WTRU 102 is allowed to access the first network 205D or a further network that the WTRU 102 was registered to prior to the first network 205D or the further network experiencing a disaster condition.

In certain representative embodiments, the WTRU 102, on condition that the registration is completed during the defined or predefined period, may send and/or receive a data transmission via the second network 205A.

In certain representative embodiments, the WTRU 102 may send and/or may receive a data transmission via the second network 205A on condition that: (1) the registration is completed during the defined period, or (2) the second registration or the re-registration is completed after the second start time.

In certain representative embodiments, the WTRU 102 may determine that the registration is not completed based on any of: (1) a registration rejection message, from a network entity 182A, being received including information indicating that the registration was rejected or (2) a registration accept message not being received within the defined period.

In certain representative embodiments, the WTRU 102 may receive information indicating: (1) that a disaster condition applies to the first network 205D, and (2) a second value used to determine when the WTRU 102 is allowed to register with or re-register with the first network 205D after the disaster condition no longer applies to the first network 205D.

In certain representative embodiments, the initiating of the registration may include the WTRU sending to a network entity 182A of a second network 205A to serve the WTRU 102, a registration request message including information indicating any of: (1) an incident identifier, (2) an identifier of the first network 205D and any of: (i) a location associated with the WTRU 102; (ii) a disaster or coverage area associated with of the WTRU 102; (iii) one or more tracking areas associated with of the WTRU 102; and/or (iv) a last visited tracking area of the WTRU 102.

In certain representative embodiments, the WTRU 102, on condition that the WTRU supports minimization of service interruption (MINT) operations, may any of: (1) determine whether the WTRU 102 has changed a coverage area from a first tracking area (TA) associated with a received TA list to a second TA associated with the received TA list; (2) send, to a network entity 182A of a first network 205A, a non-access stratum message indicating that the WTRU 102 has changed the coverage area from the first tracking area (TA) associated with the received TA list to the second TA associated with the received TA list; (3) receive an indication to re-register to a second network 205D that the WTRU 102 was previously registered with; and/or (4) re-register, by the WTRU 102 with the second network 205D.

In certain representative embodiments, the WTRU 102 may any of: (1) send information indicating a disaster roaming indication during the disaster condition (e.g., paging/broadcast of an alert of the disaster condition); and/or (2) receive a message to initiate authentication of the WTRU 102 based on at least the disaster roaming indication.

In certain representative embodiments, the reception of information indicating a value to be used during a registration to a second network 205A includes the WTRU receiving from a first network entity 182D associated with a first network 205D, configuration information indicating one or more disaster response incident identifiers (DRIDs) associated with disaster responses. For example, the WTRU 102 may receive from a second network entity 182A of the second network 205A, broadcast information indicating one or more allowed DRIDs or portions thereof. The WTRU 102 may select a DRID of the indicated DRIDs that match the one or more allowed DRIDs or portions thereof and may send to the second network entity 182A, a registration request message including information indicating the selected DRID or a portion of the selected DRID. The WTRU 102 may receive, from the second network entity 182A, a registration accept message, on condition that the WTRU 102 is within a portion of the second network 205A.

In certain representative embodiments, the selected DRID may include an area identifier (AID) corresponding to a disaster response serving area, as the portion of the second network 205A, that may be used for registration during a disaster condition associated with the first network 205D. In some examples, the WTRU 102 may be within the disaster response serving area of the second network 205A when the WTRU 102 is any of: (1) within one or more specific tracking areas of the second network 205A; (2) within one or more specific cells of the second network 205A; (3) in a vicinity of one or more specific RAN nodes of the second network 205A; (4) within a specific coverage area of the second network 205A; (5) within an entire coverage area of the second network 205A; and/or (6) in a vicinity of any RAN node of the second network 205A.

In certain representative embodiments, each DRID may include a Disaster Recovery Code (DRC) such that the selecting of the DRID of the indicated DRIDs is based on a match of one of the DRCs in the indicated DRIDs to a DRC of one of the one or more allowed DRIDs.

In certain representative embodiments, the WTRU 102, on condition that the WTRU has not registered with the first network 205D prior to the first network 205D experiencing the disaster condition, may any of: (1) select a default or predetermined disaster response incident identifier (DRID) to register with the second network 205A; (2) send, to the second network entity 182A, a registration request message including information indicating the selected DRID or a portion of the selected DRID; and/or receive, from the second network entity 182A, a registration accept message, on condition that the WTRU 102 is within a portion of the second network 205A.

Figure 9:
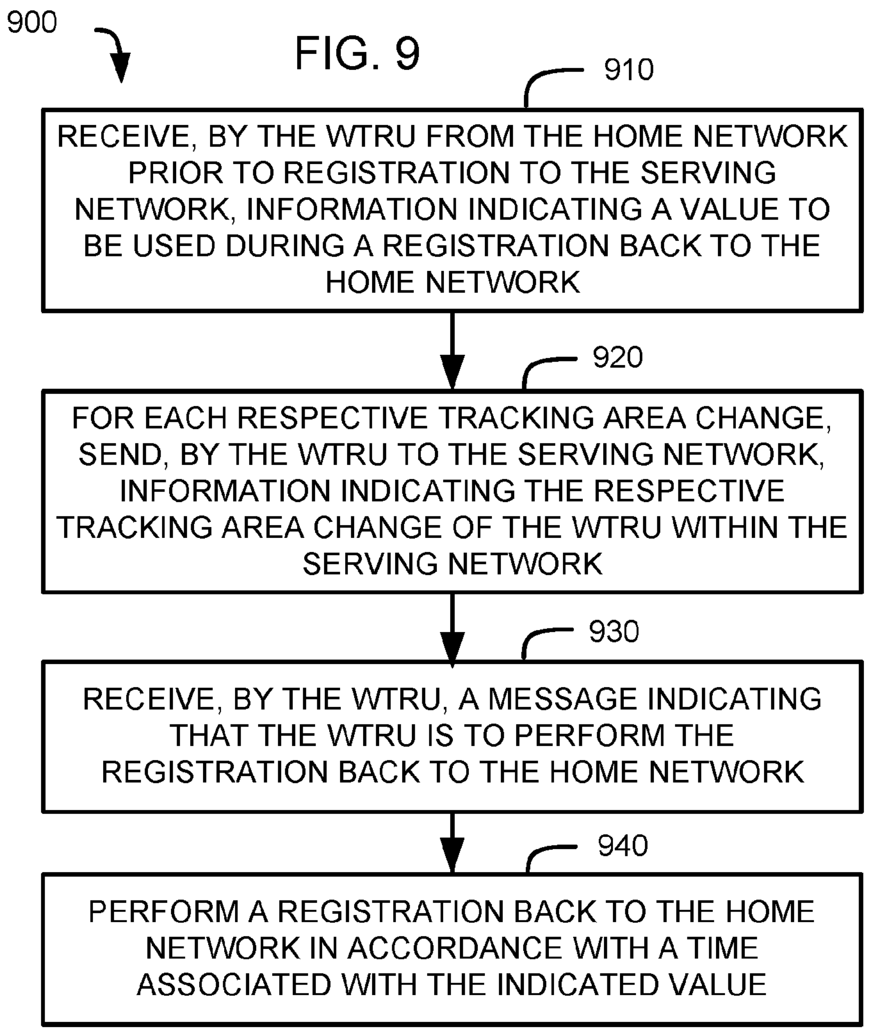
FIG. 9 is a flowchart illustrating another representative method implemented by a WTRU.

FIG. 9 is a flowchart illustrating another representative method implemented by a WTRU, which is registered to a serving network after a disaster condition applied to a home network of the WTRU.

Referring to FIG. 9, the representative method 900 may include, at block 910, the WTRU 102 receiving, from the home network 205H prior to registration to the serving network 205A, information indicating a value to be used during a registration back to the home network 205H. At block 920, the WTRU 102, for each respective tracking area change, may send, to the serving network 205A, information indicating the respective tracking area change of the WTRU 102 within the serving network 205A. At block 930, the WTRU 102 may receive a message indicating that the WTRU 102 is to perform the registration back to the home network 205H. At block 940, the WTRU 102 may perform a registration back to the home network 205H in accordance with a time associated with the indicated value.

In certain representative embodiments, a tracking area list may include information indicating a first tracking area TA-A1 of the serving network 205A and a second tracking area TA-A2 of the serving network 205A.

In certain representative embodiments, the sending of the information indicating the respective tracking area change of the WTRU 102 within the serving network 205A may be initiated by a change of the WTRU 102 from a first location within the first tracking area TA-A1 to a second location within the second tracking area TA-A2.

Figure 10:
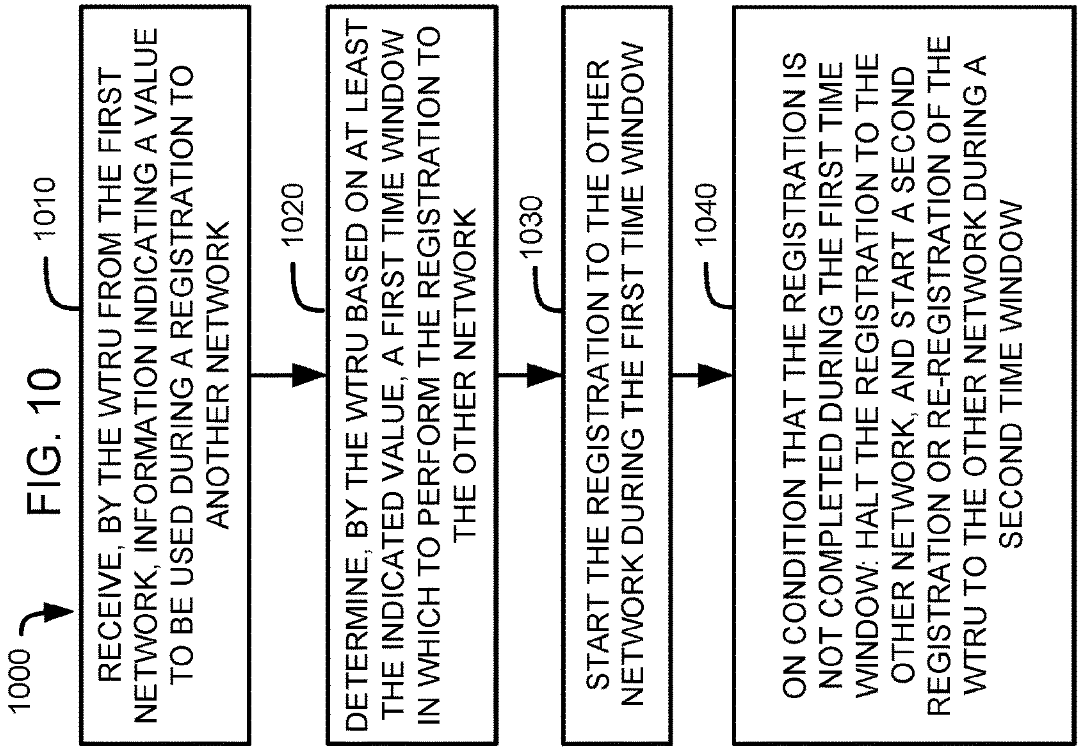
FIG. 10 is a flowchart illustrating an additional representative method implemented by a WTRU.

FIG. 10 is a flowchart illustrating an additional representative method implemented by a WTRU registered to a first network.

Referring to FIG. 10, the representative method 1000 may include, at block 1010, the WTRU 102 receiving from the first network 205D, information indicating a value to be used during a registration to another network 205A. At block 1020, the WTRU 102 may determine, based on at least the indicated value, a first time window in which to perform the registration to the other network 205A. At block 1030, the WTRU 102 may start the registration to the other network 205A during the first time window. At block 1040, the WTRU 102, on condition that the registration is not completed during the first time window, may any of: (1) halt the registration to the other network 205A, and/or start a second registration or re-registration of the WTRU 102 to the other network 205A during a second time window.

In certain representative embodiments, the reception of the information indicating the value to be used during the registration to the other network 205A may include reception of a registration accept message that may include the information indicating a timer value.

In certain representative embodiments, the WTRU 102, on condition that the registration is completed during the first time window, may send and/or receive data transmissions via the other network 205A.

In certain representative embodiments, the determination of the first time window may include a derivation of: (1) a start time and (2) one of an end time or a duration of the first time window based on: (i) the indicated value and any of: (ii) a random value; or one or more parameters specific to the WTRU 102.

Figure 11:
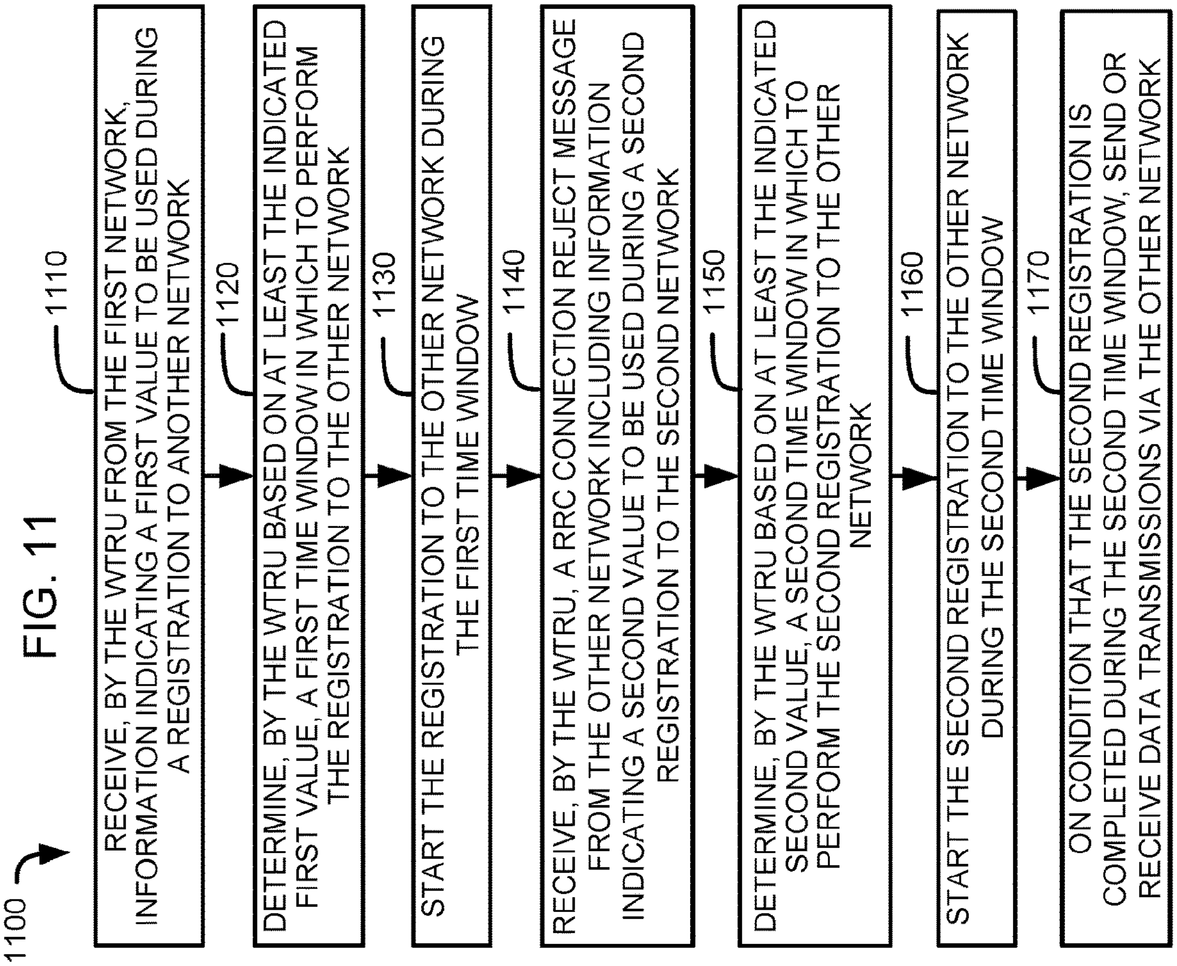
FIG. 11 is a flowchart illustrating a further representative method implemented by a WTRU.

FIG. 11 is a flowchart illustrating a further representative method implemented by a WTRU registered to a first network.

Referring to FIG. 11, the representative method 1100 may include, at block 1110, the WTRU 102 receiving from the first network 205D, information indicating a first value to be used during a registration to another network 205A. At block 1120, the WTRU 102 may determine, based on at least the indicated first value, a first time window in which to perform the registration to the other network 205A. At block 1130, the WTRU 102 may start the registration to the other network 205A during the first time window. At block 1140, the WTRU 102 may receive, a message (e.g., an RRC Connection Reject message) from the other network 205A including information indicating a second value to be used during a second registration to the other network 205A. At block 1150, the WTRU 102 may determine, based on at least the indicated second value, a second time window in which to perform the second registration to the other network 205A. At block 1160, the WTRU 102 may start the second registration to the other network 205A during the second time window. At block 1170, the WTRU 102, on condition that the second registration is completed during the second time window, may send or receive data transmissions via the other network 205A.

Figure 12:
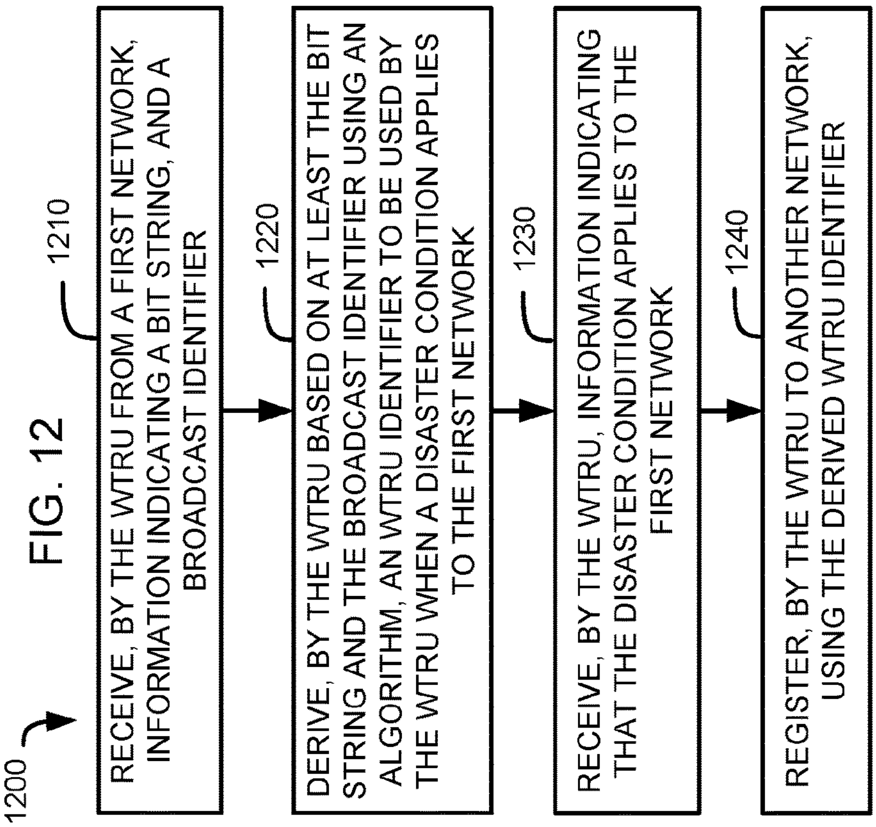
FIG. 12 is a flowchart illustrating a yet further representative method implemented by a WTRU.

FIG. 12 is a flowchart illustrating a yet further representative method implemented by a WTRU.

Referring to FIG. 12, the representative method 1200 may include, at block 1210, the WTRU 102 receiving, from a first network 205D, information indicating a bit string, and a broadcast identifier. At block 1220, the WTRU 102 may derive, based on at least the bit string and the broadcast identifier using an algorithm, an WTRU identifier to be used by the WTRU 102 when a disaster condition applies to the first network 205D. At block 1230, the WTRU 102 may receive information indicating that the disaster condition applies to the first network 205D. At block 1240, the WTRU 102 may register, to another network 205A, using the derived WTRU identifier.

In certain representative embodiments, the reception of the information indicating that the disaster condition applies to the first network 205D may include reception of a paging message including the information indicating that the disaster condition applies to the first network 205D.

Figure 13:
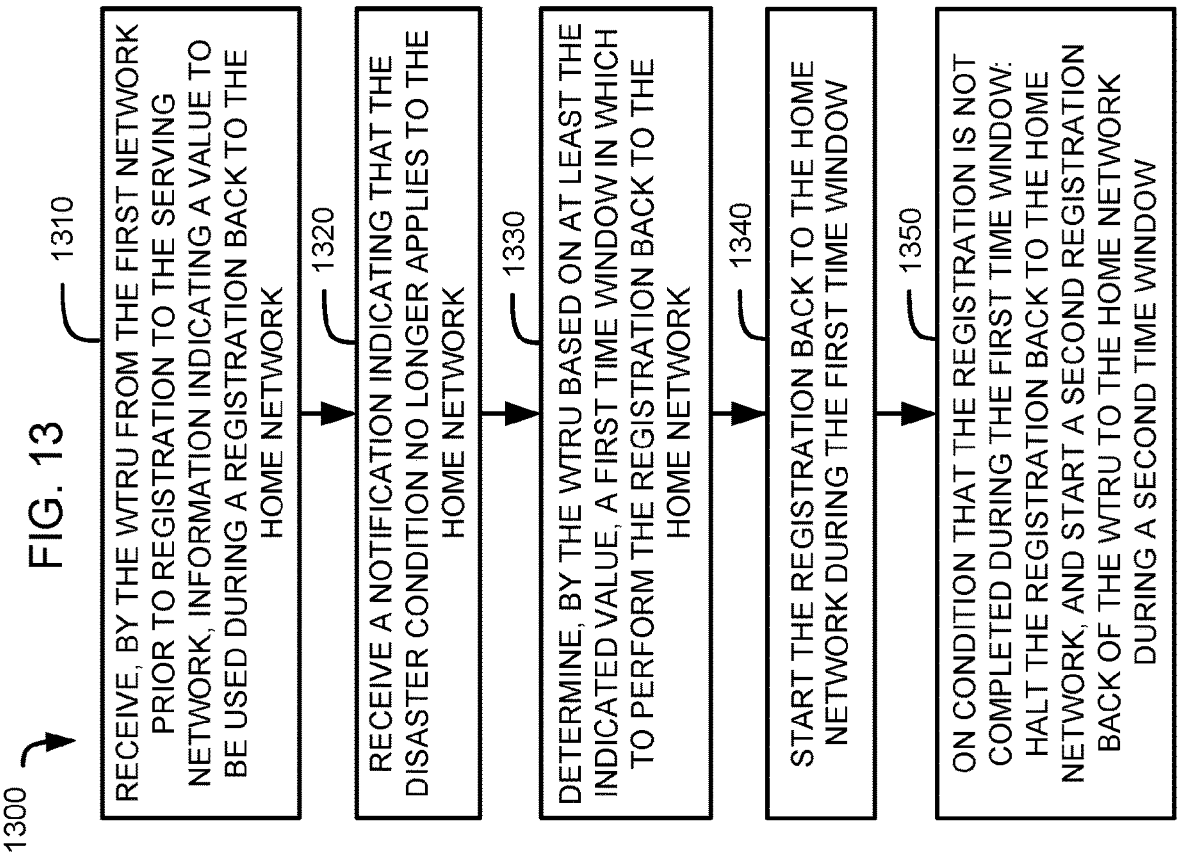
FIG. 13 is a flowchart illustrating a still further representative method implemented by a WTRU.

FIG. 13 is a flowchart illustrating a still further representative method implemented by a WTRU 102, which is registered to a serving network 205A after a disaster condition applied (e.g., had been applied) to a home network 205H of the WTRU 102.

Referring to FIG. 13, the representative method 1300 may include, at block 1310, the WTRU 102 receiving, from the home network 205H prior to registration to the serving network 205A, information indicating a value to be used during a registration back to the home network 205H. At block 1320, the WTRU 102 may receive a notification indicating that the disaster condition no longer applies to the home network 205H. At block 1330, the WTRU 102 may determine, based on at least the indicated value, a first time window in which to perform the registration back to the home network 205H. At block 1340, the WTRU 102 may start the registration back to the home network 205H during the first time window. At block 1350, the WTRU 102, on condition that the registration is not completed during the first time window, may any of: (1) halt the registration back to the home network 205H, and/or start a second registration of the WTRU 102 back to the home network 205H during a second time window.

Figure 14:
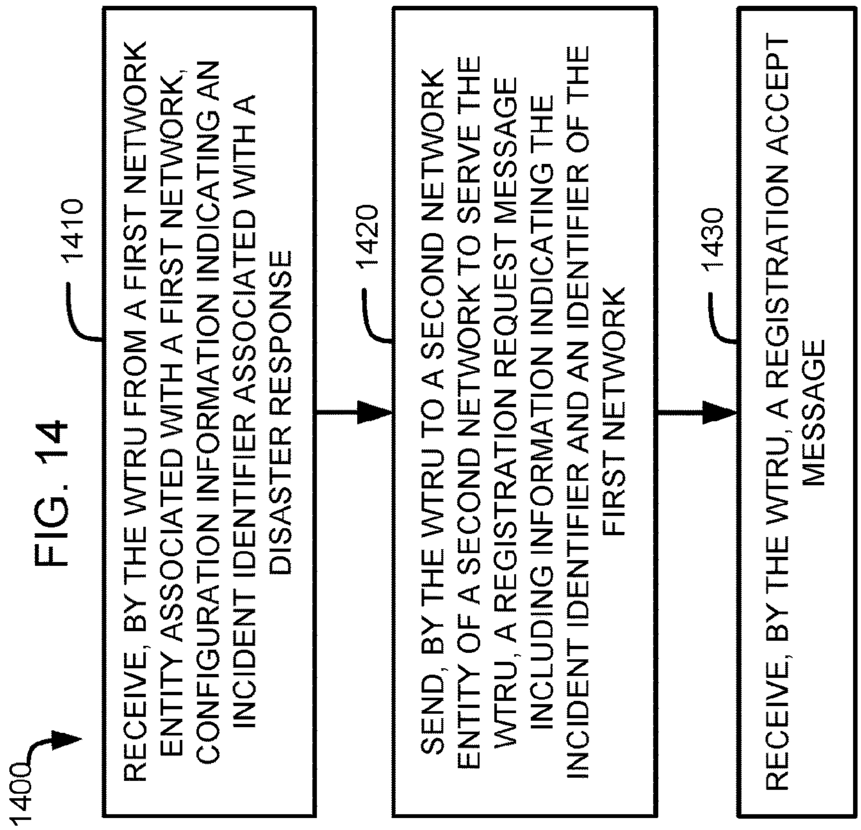
FIG. 14 is a flowchart illustrating a further additional representative method implemented by a WTRU.

FIG. 14 is a flowchart illustrating a further additional representative method implemented by a WTRU.

Referring to FIG. 14, the representative method 1400 may include, at block 1410, the WTRU 102 receiving, from a first network entity 182D associated with a first network 205D, configuration information indicating an incident identifier associated with a disaster response. At block 1420, the WTRU 102 may send, to a second network entity 182A of a second network 205A to serve the WTRU 102, a registration request message including information indicating the incident identifier and an identifier of the first network 205D. At block 1430, the WTRU 102 may receive a registration accept message.

In certain representative embodiments, the registration request may include further information indicating any of: (1) a location associated with of the WTRU 102; (2) a disaster or coverage area associated with of the WTRU 102; (3) one or more tracking areas associated with of the WTRU 102; and/or (4) a last visited tracking area of the WTRU 102.

In certain representative embodiments, the configuration information may further indicate one or more tracking areas in which registration is not allowed.

In certain representative embodiments, the WTRU 102 may determine that a current tracking area associated with the WTRU 102 does not match the one or more tracking areas indicated in the configuration information prior to the sending of the registration request message.

In certain representative embodiments, on condition that the WTRU 102 supports minimization of service interruption (MINT) operations, the WTRU 102 may configure itself during a registration procedure to (1) determine whether the WTRU 102 has changed a coverage area from a first tracking area (TA) associated with a received TA list to a second TA associated with the received TA list; and/or (2) send a non-access stratum message to the second network entity 182A indicating that the WTRU 102 has changed the coverage area from the first tracking area (TA) associated with the received TA list to the second TA associated with the received TA list. For example, the non-access stratum message may include service type information indicating that the non-access stratum message is provided to the second network 205A to inform the second network 205A of a location of the WTRU.

Figure 15:
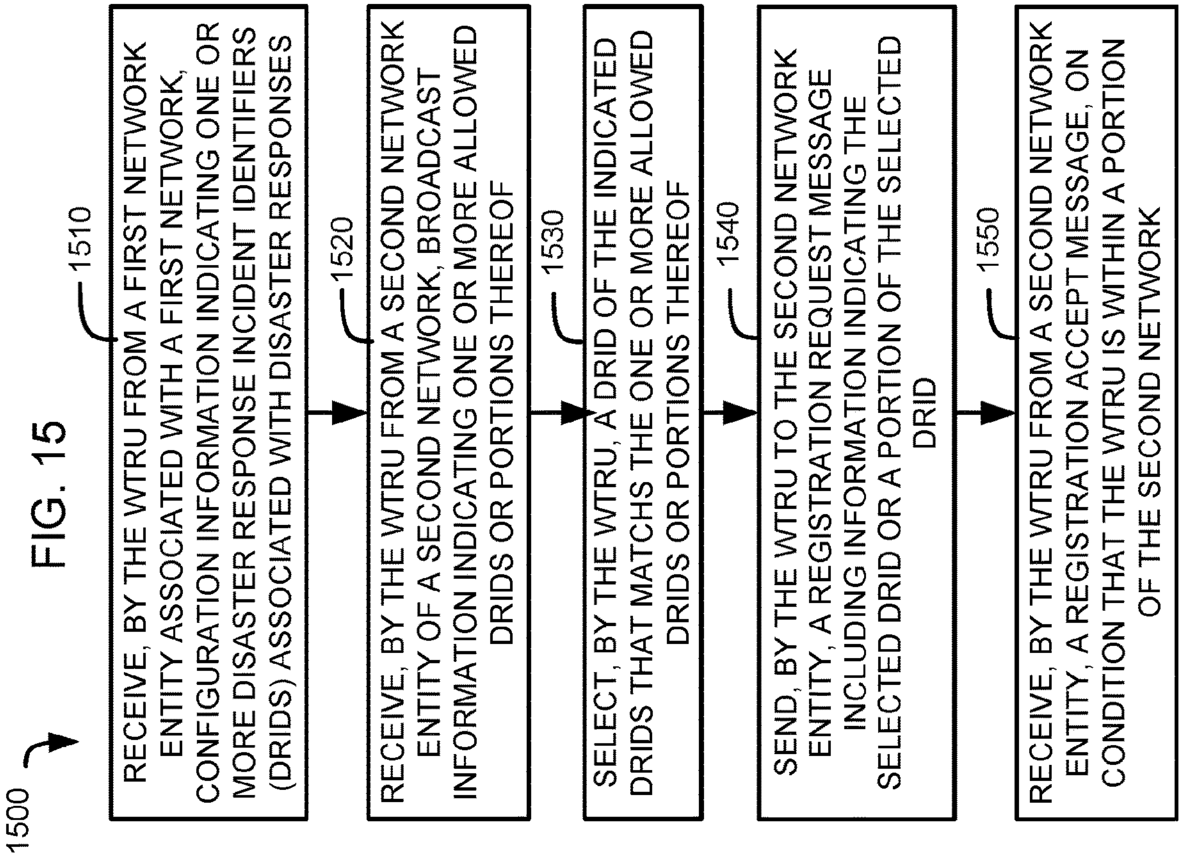
FIG. 15 is a flowchart illustrating a still additional representative method implemented by a WTRU.

FIG. 15 is a flowchart illustrating a still additional representative method implemented by a WTRU.

Referring to FIG. 15, the representative method 1500 may include, at block 1510, the WTRU 102 receiving, from a first network entity 182D associated with a first network 205D, configuration information indicating one or more disaster response incident identifiers (DRIDs) associated with disaster responses. At block 1520, the WTRU 102 may receive, from a second network entity 182A of a second network 205A, broadcast information indicating one or more allowed DRIDs or portions thereof. At block 1530, the WTRU 102 may select a DRID of the indicated DRIDs that matches the one or more allowed DRIDs or portions thereof. At block 1540, the WTRU 102 may send, to the second network entity 182A, a registration request message including information indicating the selected DRID or a portion of the selected DRID. At block 1550, the WTRU 102 may receive, from a second network entity 182A, a registration accept message, on the condition that the WTRU 102 is within a portion of the second network 205A.

In certain representative embodiments, the selected DRID may include an area identifier (AID) corresponding to a disaster response serving area, as the portion of the second network 205A, that is used for registration during a disaster condition associated with the first network 205D.

In certain representative embodiments, the WTRU 205 may be within the disaster response serving area of the second network 205A when the WTRU 102 is any of: (1) within one or more specific tracking areas of the second network 205A; (2) within one or more specific cells of the second network 205A; (3) in a vicinity of one or more specific RAN nodes of the second network 205A (4) within a specific coverage area of the second network 205A; (5) within an entire coverage area of the second network 205A; and/or (6) in a vicinity of any RAN node of the second network 205A.

In certain representative embodiments, each DRID may include a Disaster Recovery Code (DRC) such that the selection of the DRID of the indicated DRIDs is based on a match of one of the DRCs in the indicated DRIDs to a DRC of one of the one or more allowed DRIDs.

Figure 16:
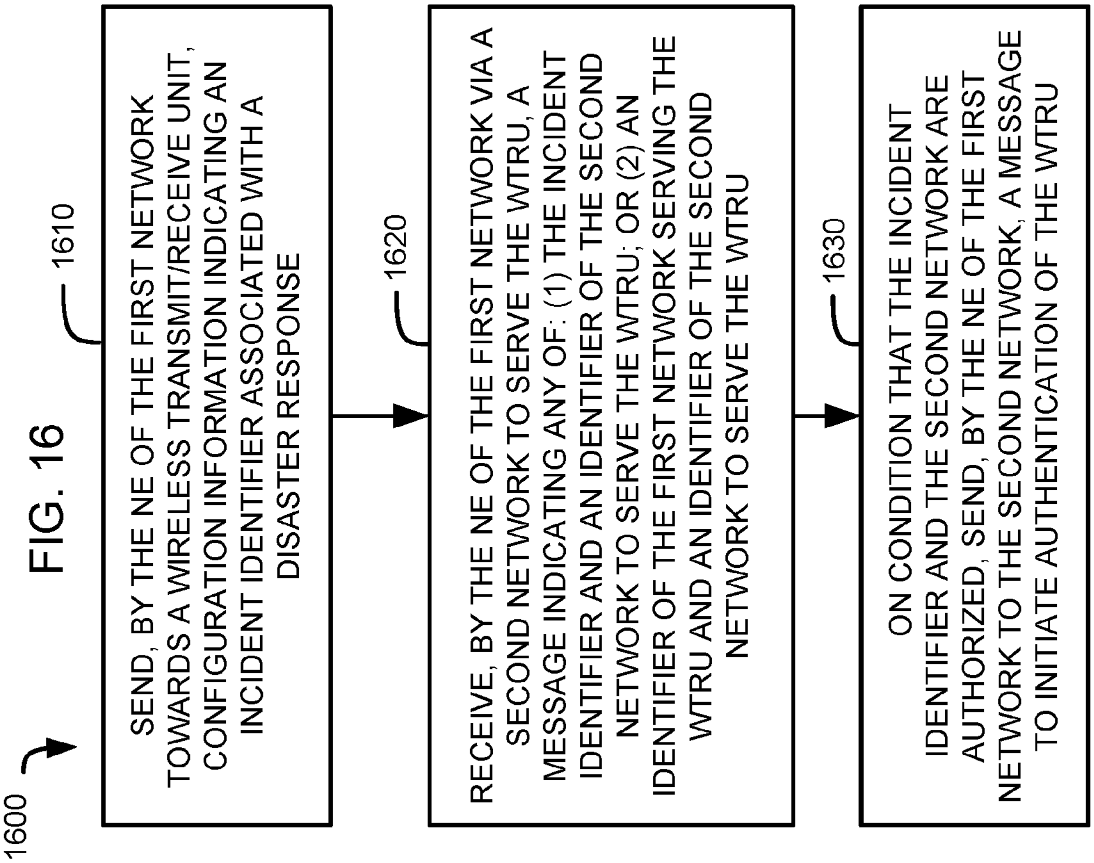
FIG. 16 is a flowchart illustrating a representative method implemented by a network entity.

FIG. 16 is a flowchart illustrating a representative method implemented by a network entity (NE) (e.g., an AUSF/UDM/DRF).

Referring to FIG. 16, the representative method 1600 may include, at block 1610, the NE 210D of the first network 205D sending towards a WTRU 102 (via a NE 182D), configuration information indicating an incident identifier associated with disaster response. At block 1620, the NE 210D of the first network 205D may receive via a second network 205A (from NE 182A) to serve the WTRU 102, a message indicating any of: (1) the incident identifier and an identifier of the second network 205A to serve the WTRU 102; and/or (2) an identifier of the first network 205D serving the WTRU 102 and an identifier of the second network 205A to serve the WTRU 102. At block 1630, the NE 210D of the first network 205D, on condition that the incident identifier and the second network 205A are authorized, may send to the second network 205A, a message to initiate authentication of the WTRU 102.

In certain representative embodiments, the NE 210D may receive information indicating a location of the WTRU 102 during a disaster condition; and may initiate authentication of the WTRU 102 based on at least the location of the WTRU 102 during the disaster condition.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wired circuitry may be used in place of or in combination with software instructions to implement the present invention. Such software may run on a processor which is housed within a robotic assistance/apparatus (RAA) and/or another mobile device remotely. In the later case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a predominantly hardware and/or firmware vehicle. If flexibility is paramount, the implementer may opt for a mostly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mate-able and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable storage medium as instructions for execution by a computer or processor to perform the actions described hereinabove. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, implemented by a wireless transmit/receive unit (WTRU) registered to a first network, the method comprising:

receiving, from the first network, information indicating a value to be used during a registration to a second network;

determining, based on at least the indicated value, at least a first start time and a second start time from which to perform the registration to the second network;

initiating the registration to the second network after the first start time; and on condition that the registration is not completed within a defined period after the first start time:

(1) halting the registration to the second network, and (2) initiating a second registration or re-registration of the WTRU to the second network after the second start time.

2. The method of claim 1, wherein:

the received information indicating the value further indicates a time window;

the defined period is based on a duration of the time window, and the method further comprises determining the time window based on (1) the first start time and (2) one of: an end time or the duration of the time window based on: (i) the indicated value and any of: (ii) a random value, or one or more parameters specific to the WTRU.

3. The method of claim 1, wherein the received information further indicates an identifier of the WTRU.

4. The method of claim 1, wherein:

the WTRU roams to the second network when the first network is not reachable by the second network, as a disaster roamer; and the received information further indicates a second value to be used to determine when the WTRU is allowed to access the first network or a further network that the WTRU was registered to prior to the first network or the further network.

5. The method of claim 1, further comprising, sending or receiving a data transmission via the second network on condition that: (1) the registration is completed during the defined period, or (2) the second registration or the re-registration is completed after the second start time.

6. The method of claim 1, further comprising determining that the registration is not completed based on any of: (1) a registration rejection message, from a network entity, being received including information indicating that the registration was rejected or (2) a registration accept message not being received within the defined period.

7. The method of claim 1, further comprising receiving, by the WTRU, information indicating: (1) that a disaster condition applies to the first network, and (2) a second value to be used to determine when the WTRU is allowed to register with or re-register with the first network after the disaster condition no longer applies to the first network.

8. The method of claim 1, wherein the initiating of any of: (1) the registration, (2) the second registration or (3) the re-registration includes sending, by the WTRU to a network entity of the second network to serve the WTRU, a registration request message including information indicating any of (1) an incident identifier, (2) an identifier of the first network and any of: (i) a location associated with the WTRU; (ii) a disaster or coverage area associated with of the WTRU; (iii) one or more tracking areas associated with of the WTRU; and/or (iv) a last visited tracking area of the WTRU.

9. The method of claim 1, further comprising configuring the WTRU to, on condition that the WTRU supports minimization of service interruption (MINT) operations:

determine whether the WTRU has changed a coverage area from a first tracking area (TA) associated with a received TA list to a second TA associated with the received TA list;

send, to a network entity of the first network, a non-access stratum message indicating that the WTRU has changed the coverage area from the first TA to the second TA;

receive an indication to re-register to the second network that the WTRU was previously registered with; and re-register, by the WTRU with the second network.

10. The method of claim 1, further comprising:

sending, by the WTRU, information indicating a disaster roaming indication by the WTRU during a disaster condition; and receiving, by the WTRU, a message to initiate authentication of the WTRU based on at least the disaster roaming indication.

11. The method of claim 1, wherein the receiving of information indicating the value to be used during the registration to the second network includes receiving, from a first network entity associated with the first network, configuration information indicating one or more disaster response incident identifiers (DRIDs) associated with one or more disaster responses, the method further comprises:

receiving, by the WTRU from a second network entity of the second network, broadcast information indicating one or more allowed DRIDs or portions thereof;

selecting, by the WTRU, a DRID of the indicated DRIDs that matches the one or more allowed DRIDs or portions thereof;

sending, by the WTRU to the second network entity, a registration request message including information indicating the selected DRID or a portion of the selected DRID; and receiving, by the WTRU from the second network entity, a registration accept message, on condition that the WTRU is within a portion of the second network.

12. The method of claim 11, wherein:

the selected DRID includes an area identifier (AID) corresponding to a disaster response serving area, as the portion of the second network, that is to be used for the registration during a disaster condition associated with the first network; and the WTRU is within the disaster response serving area of the second network when the WTRU is any of: (1) within one or more specific tracking areas of the second network; (2) within one or more specific cells of the second network; (3) in a vicinity of one or more specific radio access network (RAN) nodes of the second network (4) within a specific coverage area of the second network; (5) within an entire coverage area of the second network; or (6) in a vicinity of any RAN node of the second network.

13. The method of claim 11, wherein each DRID includes a Disaster Recovery Code (DRC) such that the selecting of the DRID of the indicated DRIDs is based on a match of one of the DRCs in the indicated DRIDs to a DRC of one of the one or more allowed DRIDs.

14. The method of claim 1, further comprising on condition that the WTRU has not registered with the first network prior to the first network experiencing the disaster condition:

selecting, by the WTRU, a default or predetermined disaster response incident identifier (DRID) to register with the second network;

sending, by the WTRU to the second network entity, a registration request message including information indicating the selected DRID or a portion of the selected DRID; and receiving, by the WTRU from a second network entity, a registration accept message, on condition that the WTRU is within a portion of the second network.

15. The method of claim 1, wherein the halting of the registration to the second network includes, on condition that a registration accept message is received during a period after the defined period is completed and prior to the second start time, ignoring or not acting on the received registration accept message.

16. A wireless transmit/receive unit (WTRU) registered to a first network, comprising:

a transmitter/receiver unit configured to receive, from the first network, information indicating a value to be used during a registration to a second network; and a processor configured to:

determine, based on at least the indicated value, at least a first start time and a second start time from which to perform the registration to the second network, initiate the registration to the second network after the first start time; and on condition that the registration is not completed within a defined period after the first start time:

(1) halt the registration to the second network, and (2) initiate a second registration or re-registration of the WTRU to the second network after the second start time.

17. The WTRU of claim 16, wherein:

the received information indicating the value further indicates a time window; and the defined period is based on a duration of the time window;

the processor is configured to determine the time window based on (1) the first start time and (2) one of: an end time or the duration of the first time window based on: (i) the indicated value and any of: (ii) a random value or one or more parameters specific to the WTRU.

18. The WTRU of claim 16, wherein the received information further indicates an identifier of the WTRU.

19. The WTRU of claim 16, wherein:

the WTRU is configured to roam to the second network when the first network is not reachable by the second network, as a disaster roamer; and the received information further indicates a second value to be used to determine when the WTRU is allowed to access the first network or a further network that the WTRU was registered to prior to the first network or the further network.

20. The WTRU of claim 16, wherein the transmitter/receiver unit is configured to send or receive a data transmission via the second network, on condition that: (1) the registration is completed during the defined period, or (2) the second registration or the re-registration is completed after the second start time.

21. The WTRU of claim 16, wherein the processor is configured to determine that the registration is not completed based on any of: (1) a registration rejection message, from a network entity, being received including information indicating that the registration was rejected, or (2) a registration accept message not being received within the defined period.

22. The WTRU of claim 16, wherein the transmitter/receiver unit is configured to receive information indicating: (1) that a disaster condition applies to the first network, and (2) a second value to be used to determine when the WTRU is allowed to register with or re-register with the first network after the disaster condition no longer applies to the first network.

23. The WTRU of claim 16, wherein the transmitter/receiver unit is configured to send, to a network entity of the second network to serve the WTRU, a registration request message including information indicating any of: (1) an incident identifier, (2) an identifier of the first network and any of: (i) a location associated with the WTRU; (ii) a disaster or coverage area associated with of the WTRU; (iii) one or more tracking areas associated with of the WTRU; and/or (iv) a last visited tracking area of the WTRU.

24. The WTRU of claim 16, wherein:

on condition that the WTRU supports minimization of service interruption (MINT) operations:

the processor is configured to determine whether the WTRU has changed a coverage area from a first tracking area (TA) associated with a received TA list to a second TA associated with the received TA list;

the transmitter/receiver unit is configured to:

send, to a network entity of the first network, a non-access stratum message indicating that the WTRU has changed the coverage area from the first TA to the second TA, and receive an indication to re-register to the second network that the WTRU was previously registered with; and the processor is configured to re-register, by the WTRU with the second network.

25. The WTRU of claim 16, wherein the transmitter/receiver unit is configured to:

send information indicating a disaster roaming indication by the WTRU during a disaster condition; and receive a message to initiate authentication of the WTRU based on at least the disaster roaming indication.

26. The WTRU of claim 16, wherein:

the transmitter/receiver unit is configured to:

receive, from a first network entity associated with the first network, configuration information indicating one or more disaster response incident identifiers (DRIDs) associated with one or more disaster responses, and receive, from a second network entity of the second network, broadcast information indicating one or more allowed DRIDs or portions thereof;

the processor is configured to select a DRID of the indicated DRIDs that matches the one or more allowed DRIDs or portions thereof, and the transmitter/receiver unit is configured to:

send, to the second network entity, a registration request message including information indicating the selected DRID or a portion of the selected DRID, and receive, from the second network entity, a registration accept message, on condition that the WTRU is within a portion of the second network.

27. The WTRU of claim 26, wherein:

the selected DRID includes an area identifier (AID) corresponding to a disaster response serving area, as the portion of the second network, that is to be used for registration during a disaster condition associated with the first network; and the WTRU is within the disaster response serving area of the second network when the WTRU is any of: (1) within one or more specific tracking areas of the second network; (2) within one or more specific cells of the second network; (3) in a vicinity of one or more specific radio access network (RAN) nodes of the second network (4) within a specific coverage area of the second network; (5) within an entire coverage area of the second network; and/or (6) in a vicinity of any RAN node of the second network.

28. The WTRU of claim 26, wherein each DRID includes a Disaster Recovery Code (DRC) such that the processor is configured to select the DRID of the indicated DRIDs based on a match of one of the DRCs in the indicated DRIDs to a DRC of one of the one or more allowed DRIDs.

29. The WTRU of claim 16, wherein:

the processor is configured to select a default or predetermined disaster response incident identifier (DRID) to register with the second network, on condition that the WTRU has not registered with the first network prior to the first network experiencing a disaster condition; and the transmitter/receiver unit is configured to:

send, to a second network entity, a registration request message including information indicating the selected DRID or a portion of the selected DRID, and receive, by the WTRU from the second network entity, a registration accept message, on condition that the WTRU is within a portion of the second network.

30. The WTRU of claim 16, wherein the processor is configured to ignore or not act on a received registration accept message, on condition that the received registration accept message is received during a period after the defined period is completed and prior to the second start time.

* * * * *